United States Patent [19]

Slotkowski et al.

[11] Patent Number: 5,182,502
[45] Date of Patent: Jan. 26, 1993

[54] AUTOMATIC HEADLAMP DIMMER

[75] Inventors: Kenneth G. Slotkowski, Westland; Paul A. Michaels, Livonia; Harold R. Macks, Detroit; Henry J. Ewald, Livonia, all of Mich.

[73] Assignees: Lectron Products, Inc., Rochester Hills; Ford Motor Company, Dearborn, both of Mich.

[21] Appl. No.: 696,162

[22] Filed: May 6, 1991

[51] Int. Cl.⁵ .......................... H05B 41/36; B60Q 1/14
[52] U.S. Cl. ...................................... 315/159; 315/82; 315/83
[58] Field of Search ................ 315/159, 82, 83, 158, 315/152, 154, 149, 156, 77, 155

[56] References Cited

U.S. PATENT DOCUMENTS

| | | | |
|---|---|---|---|
| 3,081,415 | 3/1963 | Casselman et al. | 315/83 |
| 3,121,823 | 2/1964 | Brock et al. | 315/83 |
| 3,146,374 | 8/1964 | Kikuyama | 315/83 |
| 3,177,397 | 4/1965 | Keeran | 315/83 |
| 3,188,519 | 6/1965 | Shiomi | 315/83 |
| 3,201,643 | 8/1965 | Hanano | 315/83 |
| 3,270,245 | 8/1966 | Keeran | 315/83 |
| 3,273,012 | 9/1966 | Rosenblum | 315/82 |
| 3,277,336 | 10/1966 | Miller | 315/83 |
| 3,315,122 | 4/1967 | Schuler et al. | 315/83 |
| 3,316,442 | 4/1967 | Zuse | 315/83 |
| 3,345,536 | 10/1967 | Atkins et al. | 315/83 |
| 3,381,169 | 4/1968 | Brock et al. | 226/97 |
| 3,383,552 | 5/1968 | Brock | 315/83 |
| 3,393,344 | 7/1968 | Engelmann | 315/82 |
| 3,423,633 | 1/1969 | Kawai et al. | 315/83 |
| 3,486,066 | 12/1969 | Jones et al. | 315/82 |
| 3,673,421 | 6/1972 | Hicks et al. | 315/82 X |
| 3,731,141 | 5/1973 | Hicks | 315/83 |
| 3,743,886 | 7/1973 | Cretien | 315/83 |
| 3,751,711 | 8/1973 | Schick | 315/83 |
| 3,775,639 | 11/1973 | Woodward | 315/82 |
| 3,818,265 | 6/1974 | Hicks et al. | 315/82 |
| 4,117,453 | 9/1978 | Hodgson et al. | 315/83 X |
| 4,236,099 | 11/1980 | Rosenblum | 315/83 |
| 4,357,558 | 11/1982 | Massoni et al. | 315/83 |
| 4,599,544 | 7/1986 | Martin | 315/83 |
| 4,645,975 | 2/1987 | Meitzler et al. | 315/155 |
| 4,727,290 | 2/1988 | Smith et al. | 315/82 |
| 4,891,559 | 1/1990 | Matsumoto et al. | 315/82 |

Primary Examiner—Eugene R. LaRoche
Assistant Examiner—Ali Neyzari
Attorney, Agent, or Firm—Harness, Dickey & Pierce

[57] ABSTRACT

An automatic headlamp dimmer system for switching a vehicle's headlamps from high beam to low beam when lights from another vehicle are detected in front of the vehicle. To prevent spurious responses to reflected light from signs and other sources, the dimmer system includes a light detector which is responsive only to infrared light. Also, unwanted responses to flashing lights are avoided by detecting the presence of a periodically varying light signal, and inhibiting switching between high and low beams in response thereto. The system is also capable of sensing the activation of windshield wipers and preventing headlamp switching caused by interruption of light to the system's light sensor by action of the wiper blades.

15 Claims, 27 Drawing Sheets

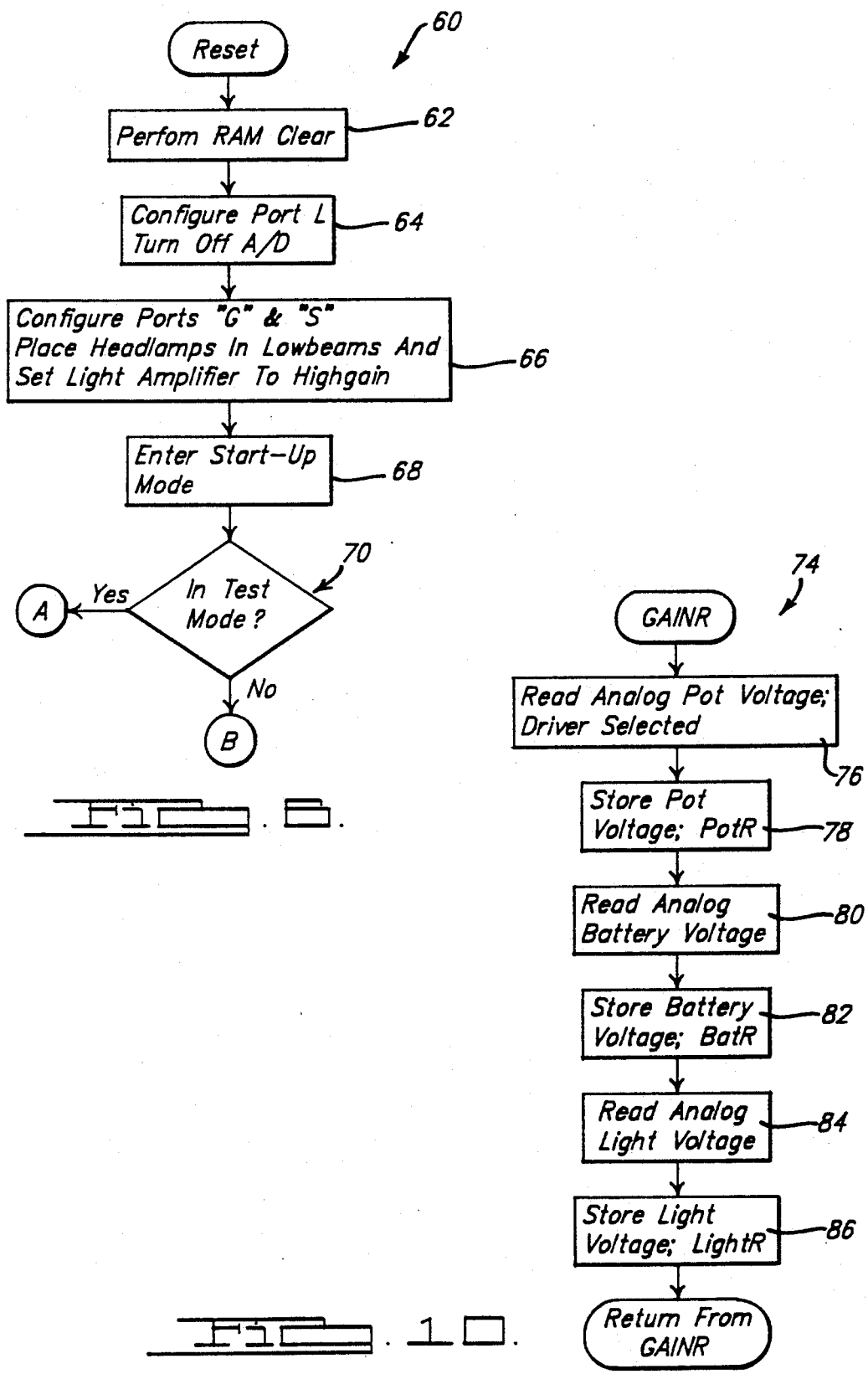

*Table 1

| RP1 | Low Beam Counter (Hex) | High Beam Counter (Hex) |
|---|---|---|
| 51 < RP1 | 36 | 4 |
| 46 < RP1 < 51 | 3A | 4 |
| 41 < RP1 < 46 | 3D | 5 |
| 36 < RP1 < 41 | 49 | 5 |
| 31 < RP1 < 36 | 4A | 6 |
| 26 < RP1 < 31 | 52 | 7 |
| 21 < RP1 < 26 | 58 | 7 |
| RP1 < 21 | 63 | 9 |

* At μC Clock Frequency Of 2.5 MHz

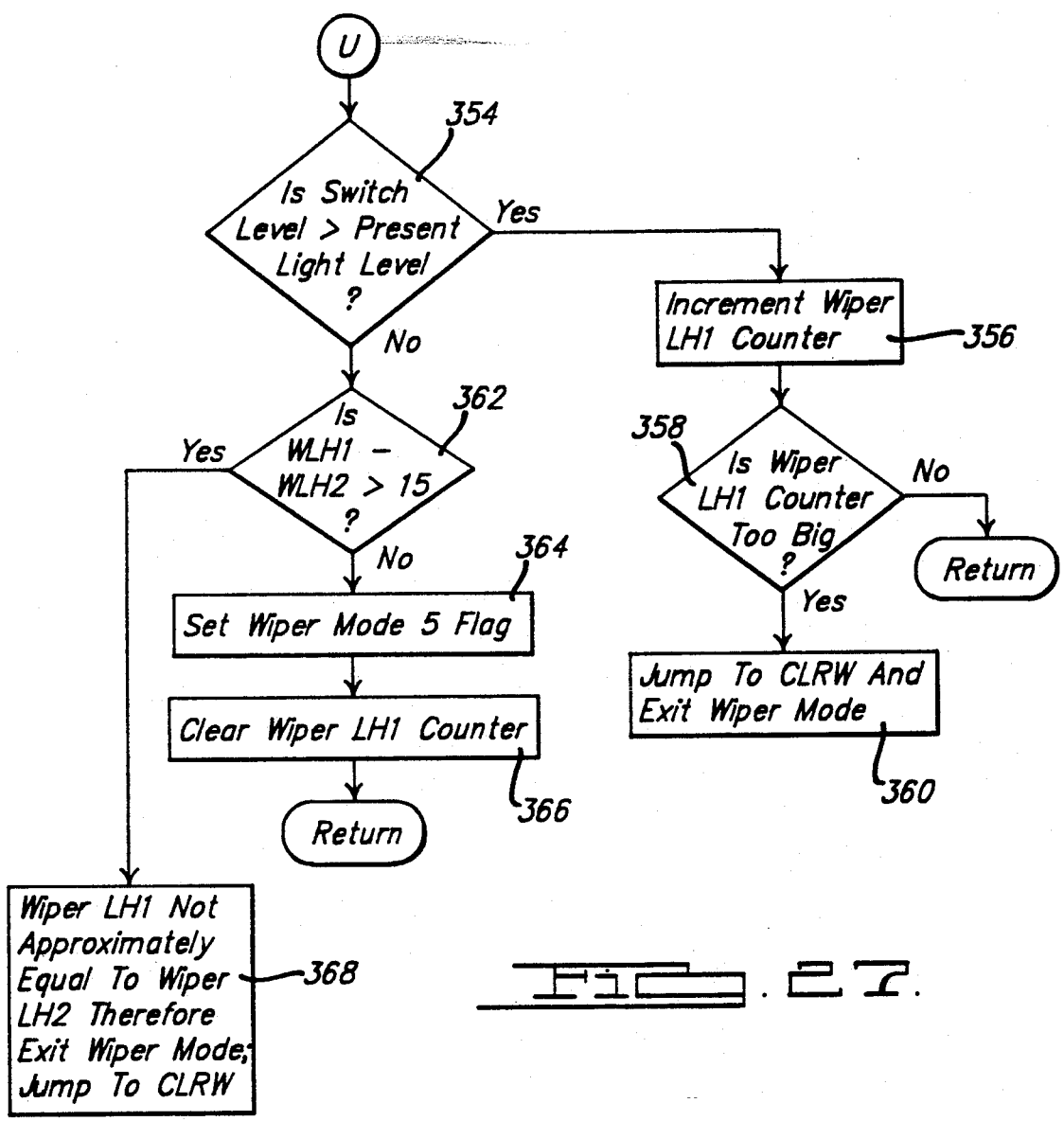
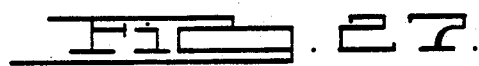
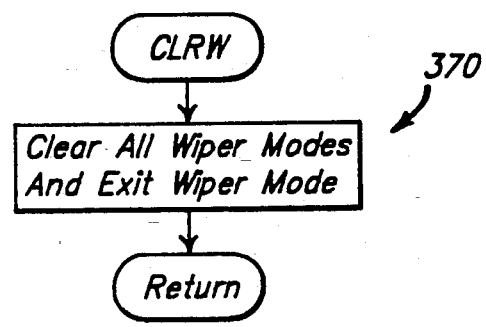
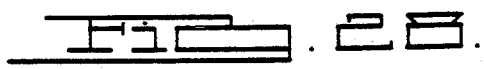

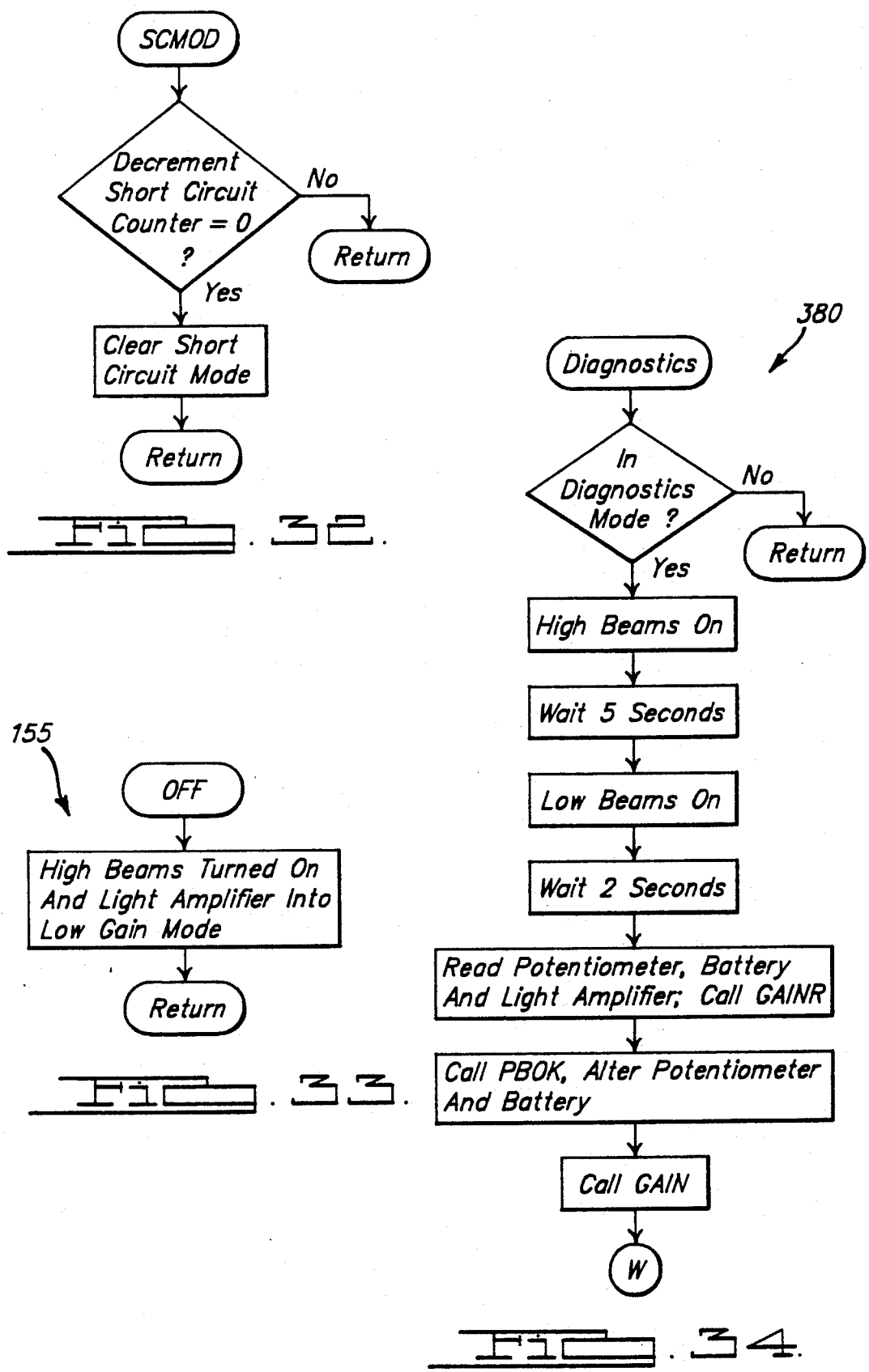

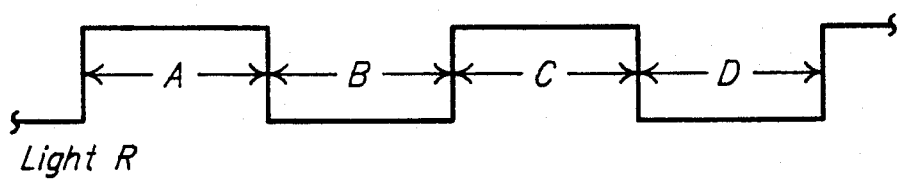
Light R
ACD: A.C. Detect Using Amplifier Light Input On A/D;
Criteria: A, B < 2 Sec;
A ≈ C And B ≈ D. If Criteria Valid, Then Freeze Output State.
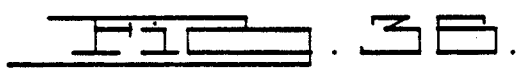
FIG. 36.
Light R
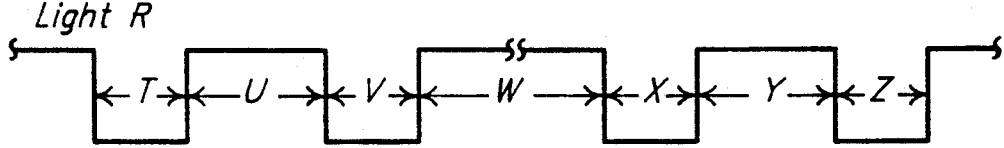
Wiper: Winshield Wiper Detect Using Amplifier Light Input On A/D;
Criteria: T ≈ V ≈ X ≈ Z;
U < 800 msec. If Criteria Valid, Return Time Adapted To Be > T + 20 msec.
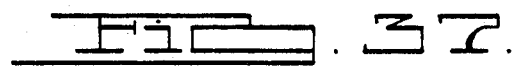
FIG. 37.

AUTOMATIC HEADLAMP DIMMER

BACKGROUND AND SUMMARY OF THE INVENTION

This invention relates to vehicle headlamp systems, and in particular to a system for automatically controlling the switching of the headlamps between the low beam and high beam settings.

Improved automotive control systems have freed drivers from performing a number of tasks that formerly required manual operations. Such systems relieve drivers from the distractions of these auxiliary systems and often results in improved concentration as well as reduced driver fatigue. One such system which has seen limited use is an automatic headlamp dimmer system for controlling the headlamps of a vehicle. In particular, an automatic headlamp dimmer system is designed to automatically dim the headlamps-i.e. switch from high beam to low beam-in the presence of lights from other vehicles. Since a vehicle's headlamps should be dimmed for both oncoming traffic as well as traffic being approached from behind, it is necessary for an automatic headlamp dimmer system to accurately sense both the presence of another vehicle's headlamps or taillamps.

While numerous automatic headlamp dimmer control systems have been developed, in general, these systems have had serious drawbacks due to poor performance, complexity or cost. These shortcomings, particularly in the area of performance, have been directly responsible for the limited use of automatic headlamp dimmer systems to date. Since these systems must sense light from headlamps as well as taillamps from other vehicles, a key performance requirement is the system's capability to distinguish this light from extraneous incoming light. Examples of such unwanted light include reflections from road signs, light from street lamps, or light from vehicles on other roadways. The problem of avoiding false responses to extraneous light signals is especially troublesome when it is considered that the intensity of these extraneous light signals can be many times greater than the intensity of the light signal from a taillamp. As a result, some prior art systems simply do not attempt to detect valid taillamp signals, but rather are designed to respond only to the light from oncoming headlamps which, of course, presents a much stronger signal. Other systems with sufficient sensitivity to detect the light from taillamps are susceptible to false triggering which degrades performance and leads to a lack of driver confidence in the system. As a result, users frequently disable the systems entirely and revert to manual control.

Spurious responses in automatic headlamp dimmer systems are also encountered in the presence of overhead flashing lights. Such flashing may be produced, for instance, by blinking overhead traffic lights, or by blinking construction lights or arrows. These flashes, when detected by conventional automatic headlamp dimmer sensors, can cause the system to undesirably cycle between high and low beams in synchronization with the flashing light. A similar situation is also encountered when windshield wipers are operated if the light sensor for the automatic headlamp dimmer system is positioned behind the windshield within the sweep of the wipers. Such placement is desirable because the sensor is not exposed to exterior debris, and further because the sensor's view is likely to be as unobstructed and clear as the driver's view. However, when the windshield wipers are operated, the sensor's field of view is periodically occluded by the wiper blade. This may cause the headlamp dimmer system (when in the low beam mode) to cycle to the high beam mode while the wiper is obstructing the view, and conversely to return back to the low beam mode when the wiper is not obstructing the sensor's field of view. Obviously, cycling of the automatic headlamp dimmer in response to flashing lights and windshield wiper activity is highly annoying and contributes to the low usage of such systems.

It is accordingly, a primary object of the present invention to provide an improved automatic headlamp dimmer system that is responsive to both the headlamps and taillamps of other vehicles, and yet is able to reliably distinguish between valid light signals and extraneous light signals.

It is another primary object of the present invention to provide an improved automatic headlamp dimmer system that is able to disregard blinking lights from stop lights and the like and thereby avoid spurious activation of the headlamp dimmer in response thereto. It is also an object of the present invention to provide an automatic headlamp dimmer system which has its light sensor mounted behind the windshield, with the sweep of the windshield wipers in its optical field of view, and yet which is non-responsive to the operation of the windshield wipers.

Generally, these objects are accomplished by providing a system that is sensitive to light only in the near infrared region, and which excludes other wavelengths including light in the visible region. More particularly, it has been determined that light from headlamps and taillamps contains a significant amount of signal information in the infrared region. On the other hand, light from extraneous light sources such as street lamps, reflections from road signs, etc., predominate in the visible region and contain very little signal information in the infrared band. Accordingly, by responding only to light in the near infrared region, the signal to noise ratio of the present system is greatly enhanced, thereby enabling the system to accurately recognize a taillamp signal in the presence of extraneous light signals several orders of magnitude greater in intensity.

Additionally, the automatic headlamp dimmer, according to the present invention, is able to detect the presence of a spurious periodically varying light signal and temporarily disable its switching capabilities to effectively ignore the spurious signal. In one embodiment of the present invention, the automatic headlamp dimmer system is provided with the capability of determining if periodic variations in the input light signal are characteristic of variations expected by operation of the vehicle's windshield wipers. If the received signal exhibits a predefined repetitive pattern, the system will respond by not allowing switching from low beam to high beam to occur during the time that the wipers block the field of view of the sensor.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIGS. 6-35 comprise a set of software flow charts outlining the steps performed by the automatic headlamp dimmer control module in the preferred embodiment of the present invention;

FIG. 36 is a diagram of the characteristic flashing light signal pattern detected by the present invention; and FIG. 37 is a diagram of the characteristic light signal pattern caused by the operation of windshield wipers detected by the present invention.

DETAILED DESCRIPTION OF THE INVENTION

Figure 1:
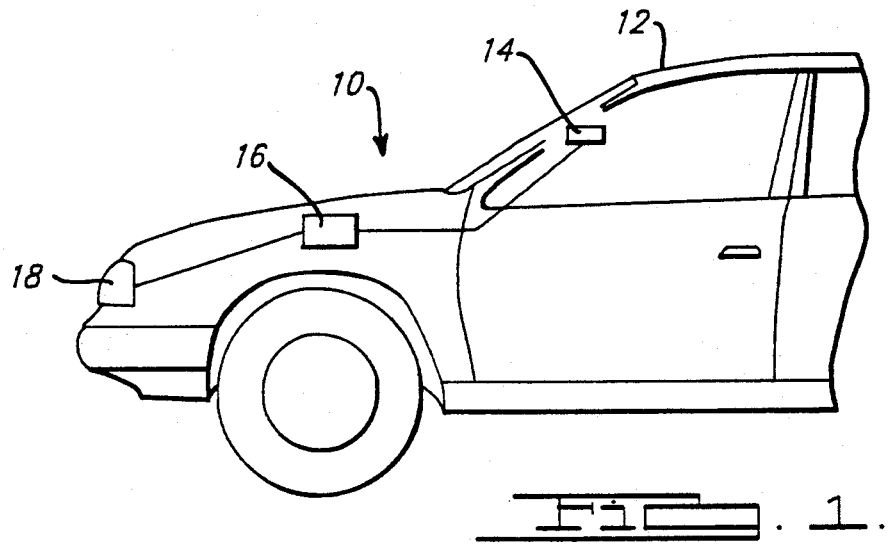
FIG. 1 is a partial view of a vehicle incorporating the automatic headlamp dimmer system in accordance with the present invention.

FIG. 1 illustrates an automatic headlamp dimmer system 10 mounted to a vehicle 12 for automatically controlling the actuation of the high and low beams in the vehicle's headlamps. The automatic headlamp dimmer system 10 includes a sensor control module 14 which is preferably located in the vicinity of the vehicle's central rear view mirror (not shown). The sensor module 14 is coupled to a headlamp control unit 16 which is coupled to the vehicle's front headlamps 18 for controlling their high/low beam operation. The sensor control module 14 is preferably mounted in a position where its view through the vehicle's windshield is through the area swept by the vehicle's windshield wipers to insure an unobstructed and undistorted view ahead of the vehicle, even during inclement weather. The preferred construction and configuration of the optical components of the sensor control module 14 according to the present invention are described in copending U.S. application Ser. No. 598,901, filed Oct. 15, 1990.

The primary method used by the present invention to prevent the automatic headlamp dimmer module 14 from responding to spurious light signals is to restrict the optical bandwidth of the light sensor to light signals in the infrared region; i.e., light signals having a wavelength above 750 nanometers. In other words, all light in the visible region—i.e., below 700 nanometers—is excluded. Consequently, reflected light signals from such things as roadside signs, guard rails, and reflectors, which are rich in light in the visible region, as well as street lights and other fluorescent light sources which produce light that tends to predominate in the visible and near ultraviolet region, are optically filtered out and ignored by the present system. However, because both vehicle headlamps and taillamps employ incandescent bulbs which are operated around 2856° K., the resulting light emitted by such bulbs actually contains more infrared than visible light. Accordingly, by focusing the attention of the automatic headlamp dimmer module 14 exculsively on light information in the infrared region, the overall signal-to-noise ratio of the system is greatly enhanced. Consequently, the present auto dimmer system is capable of reliably detecting light from the rear taillamps of a vehicle, for example, even in the presence of extraneous light signals of substantially greater magnitude.

Figure 2:
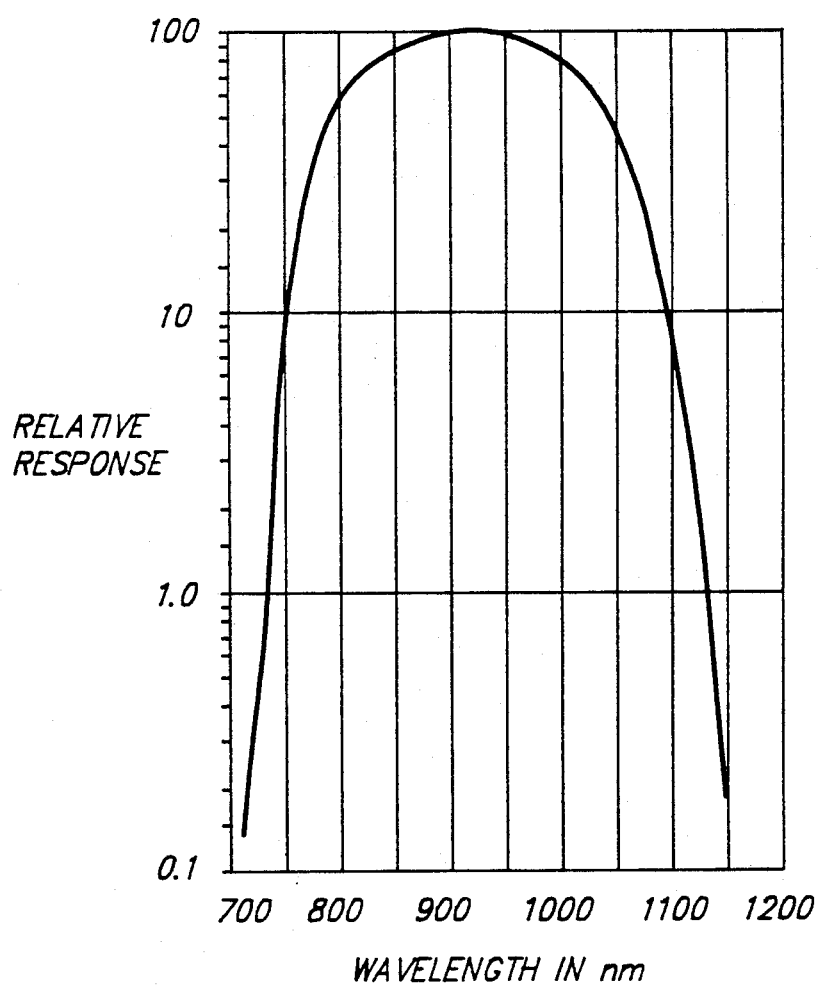
FIG. 2 is a graph of the relative response of the photosensor used in the automatic headlamp dimmer system in accordance with the present invention.

In the preferred embodiment of the present invention, this is accomplished by employing a silicon photodetector as the light sensor 24, and encapsulating the detector in an epoxy material that has been doped so as to be opaque to visible light and transparent to infrared light. A conventional silicon photodetector has a typical response curve that includes the visible light region, as well as a strong response in the infrared region. The addition of the doped epoxy material, therefore, effectively cuts off the portion of the response curve of the detector below the infrared region as desired. The resulting response curve of the light sensor 24 used in the present invention is shown in FIG. 2. It should be noted that while other means of achieving the desired type of filtering is possible, such as by using optical bandpass filters, the present approach is believed to be the most cost effective.

Figure 3:
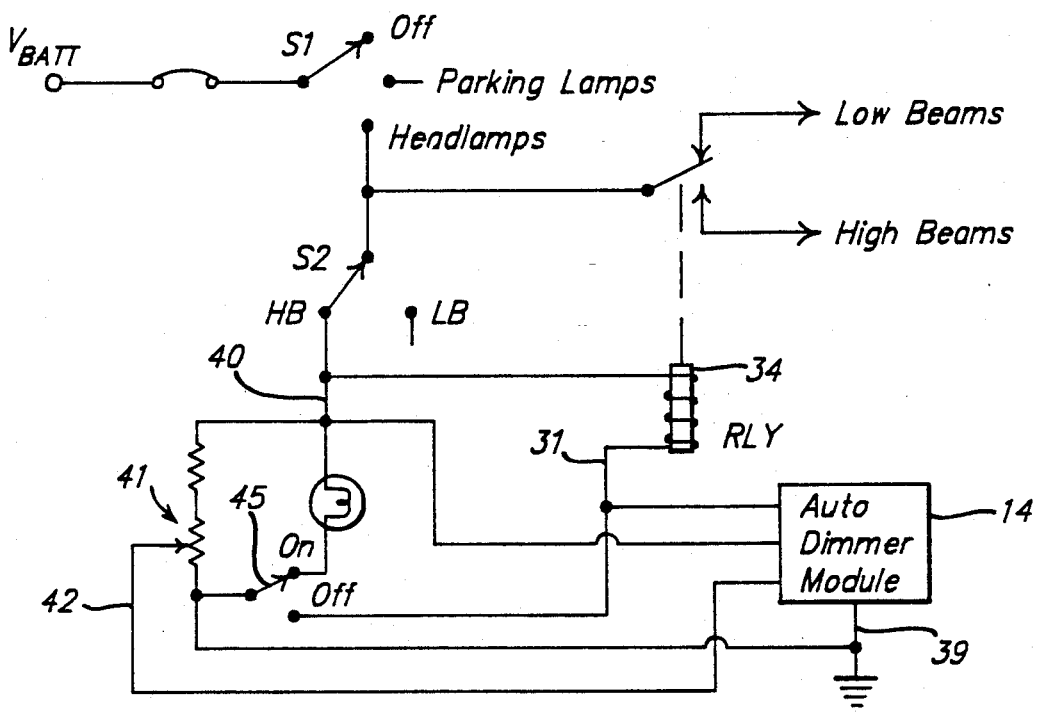
FIG. 3 is a system schematic diagram of a headlamp control system incorporating an automatic headlamp dimmer control module according to the present invention.

Referring to FIG. 3, a system schematic diagram of a headlamp control system of a vehicle incorporating the automatic headlamp dimmer control module 14 according to the present invention is shown. Power to the module 14 is provided on line 40 from the battery through the main headlamp control switch S1 and the manual dimmer switch S2 which must be in the high beam position for the module to receive power. The output control signal from the module 14 is supplied on line 31 to control energization of the relay 34 which controls the switching of the headlamps between high and low beams. As will subsequently be described in greater detail, a potentiometer 41 mounted on the instrument panel of the vehicle provides the operator with the ability to adjust the sensitivity of the control module 14. Optionally, an ON/OFF switch 45 may be incorporated into the sensitivity potentiometer 41 to disable the automatic headlamp dimmer control module 14 and thereby permit the operator to revert to manual control of the headlamps via the dimmer switch S2.

Figure 4A:
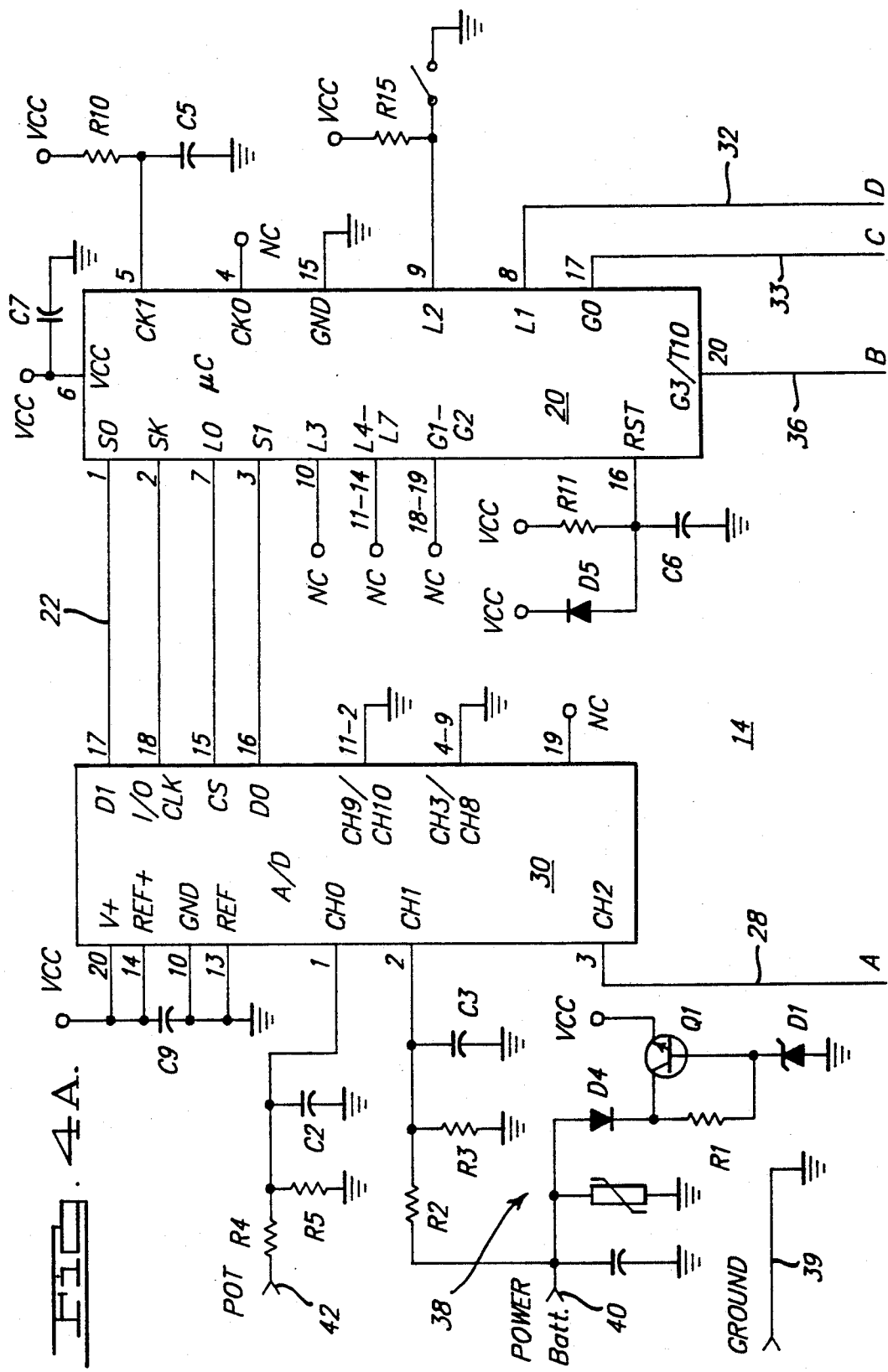
FIGS. 4A and 4B comprise a circuit diagram of the automatic headlamp dimmer control module according to the present invention.
Figure 4B:
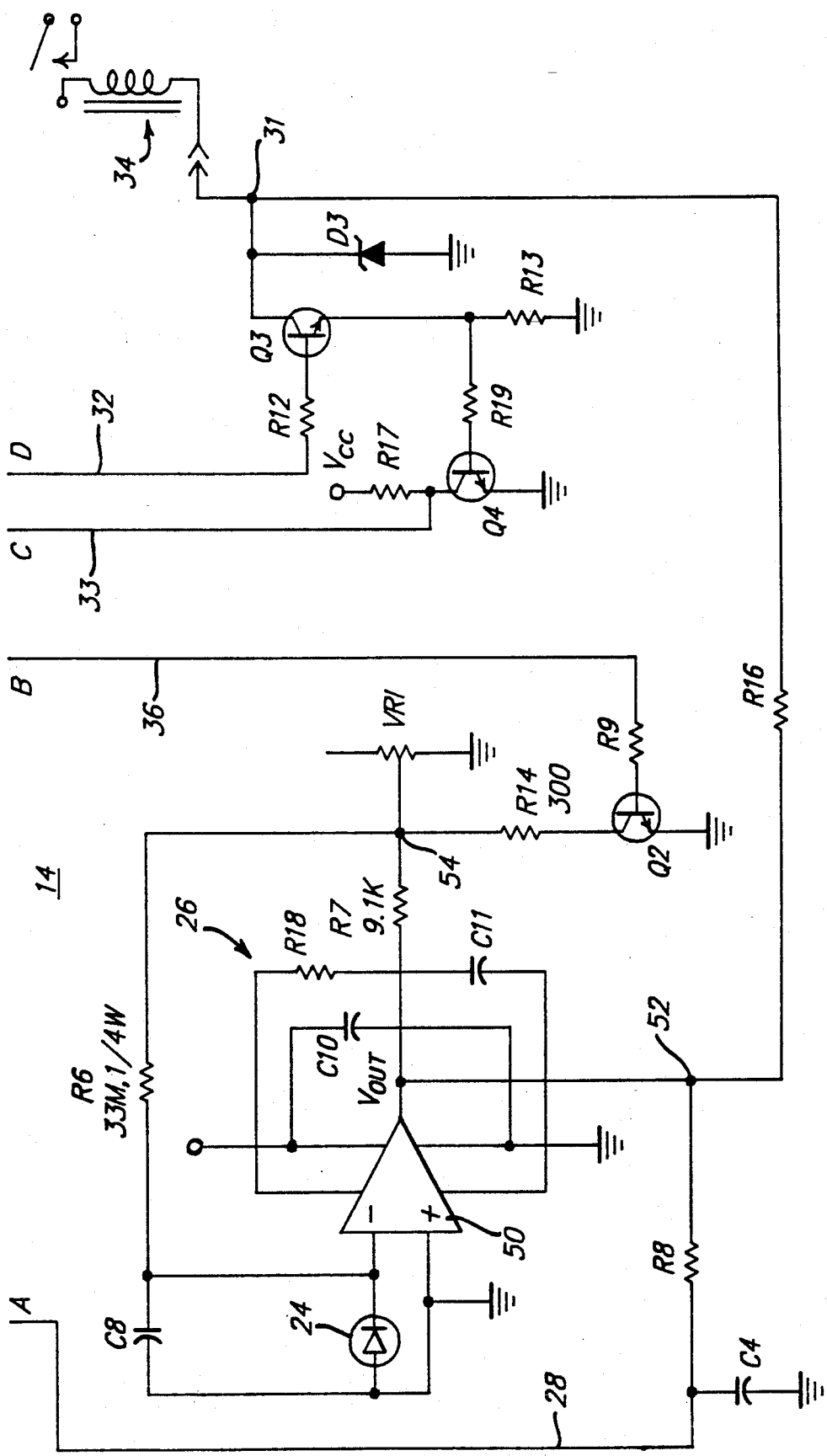

Turning to FIGS. 4A and 4B, a circuit diagram of the automatic headlamp dimmer control module 14 according to the present invention is shown. The circuit in the preferred embodiment is microprocessor-based, although a custom integrated circuit or other alternative implementation approach could also be used. In particular, the present circuit uses an 8-bit microcomputer 20, Model Number COP842C, manufactured by National Semiconductor Corporation, which contains 2K bits of ROM and 128 bits of RAM. The microcomputer 20 receives input data via a serial data link 22 from an analog-to-digital (A/D) converter 30. The output signal from a light sensor 24 located in the sensor module 14 is amplified by an amplifier circuit 26 and provided via line 28 to the CH2 input of the A/D converter 30. As will subsequently be explained in greater detail, the microcomputer 20 is programmed to analyze the incoming light signal received on serial data line 22 from the A/D converter 30 to determine the presence of light from another vehicle. If light from another vehicle is detected—i.e., if the light signal exceeds a programmed switching threshold—the microcomputer 20 is programmed to produce an output signal on line 32 that is effective to deenergize the relay coil 34 of an external relay which in turn causes the headlamps of the vehicle to switch from the high beam setting to the low beam setting.

Simultaneously, the microcomputer 20 is programmed to produce an output signal on line 36 which is effective to change the gain of the amplifier circuit 26 to introduce a hysteresis effect into the system. In other words, if the detection of a light signal above a first level is sufficient to cause the system to switch from high to low beam, the intensity of the detected light signal must drop below a second lower level before the system will switch back from low to high beam. In this manner, the present system avoids the problem of rapidly switching the headlamps back and forth between the high and low beam settings when the detected light signal is around the threshold level.

In addition, as previously noted, the present system provides a user sensitivity control in the form of an external potentiometer 41 which is typically located on the instrument panel of the vehicle. By adjusting the setting of the potentiometer 41 the operator can alter the relative switching threshold of the system and thereby adjust the sensitivity of the system to external light signals.

The system 10 includes a power supply circuit 38 that is connected to the positive terminal of the battery via input connector 40. The power supply circuit 38 provides the system with a regulated voltage (Vcc) of approximately 5.5 volts. Capacitor C1 and a metal oxide varistor (MOVI) device protect the circuit from voltage transients which may be produced in the vehicle electrical system and diode D4 provides reverse voltage protection.

The light sensor used in the preferred embodiment comprises a photo diode 24 that is connected directly across the inputs of an operational amplifier 50. Thus, it will be appreciated that the photo diode 24 is operated in its more stable "short circuit" mode which enhances the reliability of the device at the low light levels which the system is required to operate. The output 52 of the op amp 50 is fed back to its negative input through resistors R6 and R7. The midpoint 54 between resistors R6 and R7 is connected to the wiper of a variable resistor VR1 and through a resistor R14 to the collector of a switching transistor Q2 which has its emitter connected to ground. The base of transistor Q2 is connected through a coupling resistor R9 via line 36 to an output port G3 of microcomputer 20.

Since the value of resistor R6 is several orders of magnitude greater than the value of resistor R7, the voltage at the output 52 of op amp 50 is given by the following:

$$V_{out} = \frac{I_L \times R6}{\alpha}$$

where
$I_L$ = the current produced by the light sensor 24, and
$\alpha$ = attenuation ratio which is less than 1.
The attenuation ratio "$\alpha$" is in turn determined by the relative values of resistor R7 and parallel resistances R1 and R14', where R1 is the resistance value between the wiper of variable resistor VR1 and ground, and R14' is the resistance value of the resistor R14 plus the resistance value of Q2 between its collector and emitter (ground).

More particularly, the attenuation ratio $\alpha$ is equal to the following:

$$\alpha = \frac{R_p}{R_p + R7}$$

where $R_p = \frac{R1 \times R14'}{R1 + R14'}$ when switching transistor Q2 is conducting; and
where $R_p = R1$
when switching transistor Q2 is not conducting. Consequently, it can be seen that the gain of amplifier circuit 26 is changed based upon the conductive state of transistor Q2. In particular, when Q2 is turned off, the value of $\alpha$ is approximately equal to 0.167 and the gain of amplifier circuit 26 is equal to 200 volts/$\mu$A input. However, when transistor Q2 is turned on, the value of $\alpha$ equals 0.033 and, consequently, the gain of amplifier circuit 26 increases to approximately 1000 volts/$\mu$A input.

In practice, the value of resistor R7 is much larger than the value of resistor R1 or of its parallel combination with R14', and hence the value of the hysteresis can be approximated by the relation:

$$\text{Hysteresis} \approx 1 + \frac{R1}{R14'}$$

In operation, transistor Q2 is turned off by microcomputer 20 when the high beam lamps are on. Accordingly, a relatively high light intensity signal must be detected by light sensor 24 for the $V_{OUT}$ signal provided on line 28 to the A/D converter 30 to exceed the switching threshold level programmed into the microcomputer 20. When this occurs, the microcomputer 20 will switch off the high beam lamps. However, when the microcomputer 20 produces the output signal on line 32 to turn off the high beam lamps, it simultaneously produces an output signal on line 36 which is effective to turn on transistor Q2 and increase the gain of amplifier circuit 26. Consequently, the intensity of the light signal detected by light sensor 24 must diminish to a substantially lower level before the $V_{OUT}$ signal on line 28 drops below the switching threshold level of the microcomputer 20 to trigger the microcomputer 20 to again turn on the high beam lamps.

Significantly, it will be appreciated that by introducing hysteresis into the system via an adjustment in the gain of the amplifier circuit 26, rather than by providing two separate switching thresholds, the dynamic range requirements of the amplifier circuit 26 and A/D converter 30 are minimized, thereby permitting the use of a relatively inexpensive A/D converter 30. Also, this design permits the use of a switching threshold in the microprocessor 20 which can be adjusted without effecting the hysteresis. In some previous automotive headlamps dimmer systems the operator adjustment of the switching threshold produced undesirable changes in the balance between the upper and lower thresholds. By decoupling the user controlled potentiometer 41 from the hysteresis circuitry, this problem is avoided. The resistance "R1" in the amplifier circuit 26 is supplied by a variable resistance VR1 to provide a means of calibrating the light sensor 24 so that a predetermined voltage signal is provided at $V_{OUT}$ node 52 for a given light intensity signal impinging on the light sensor 24.

Figure 5:
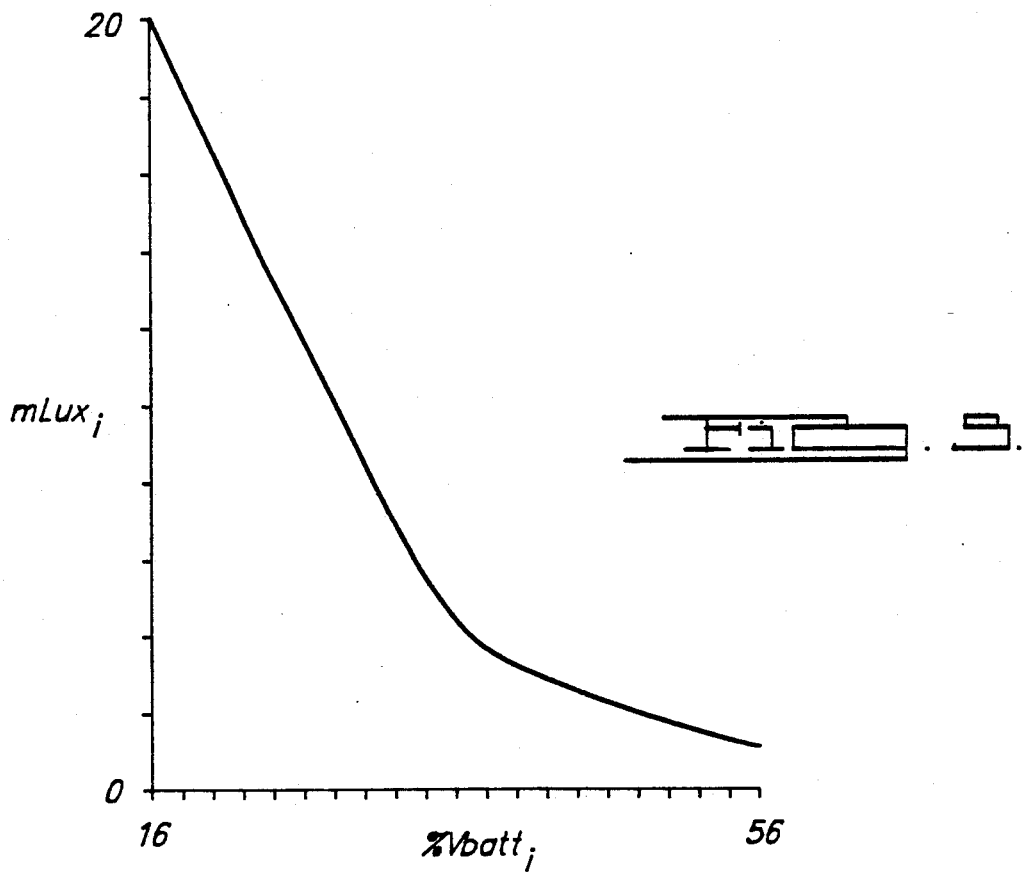
FIG. 5 is a graph of the relationship between the input light level and the resulting light signal current in accordance with the present invention.

As noted previously, the present system provides a user adjustable sensitivity control which enables the user to adjust the switching threshold of the microcomputer 20. in particular, rather than a single switching threshold, the microcomputer 20 in the preferred embodiment has programmed therein a sensitivity curve, as shown in FIG. 5, which comprises a defined set of selective switching threshold points. In other words, by adjusting the resistance value of the sensitivity control potentiometer, 41 the user selects a particular milliLux (mLux) value from the curve that is used by the microcomputer 20 as the switching threshold value for the system.

Referring to FIG. 5, it will be noted that the particular curve selected for use in the preferred embodiment comprises an approximation of a second order polynomial which provides a substantial adjustment range in the lower 1-5 mLux range where a small change in value can have a relatively large perceived change in the response of the system. In this manner, the sensitivity curve correlates to the square law of light intensity versus distance. It will be appreciated, however, that other curves can also be used. Importantly, it will be noted from the sensitivity curve in FIG. 5, that the mLux value is determined in accordance with a voltage signal that is designated "percentage of battery voltage" (% Vbatt). More particularly, it will be recalled from FIG. 2 that terminal 42 is connected to the wiper of a potentiometer 41 that is in turn connected between battery voltage and ground. The voltage signal from the sensitivity control potentiometer 41 at terminal 42 is provided to the CH0 input of the A/D converter 30 through an attenuator and low pass filter circuit comprised of resistors R4 and R5 and capacitor C2. Similarly, terminal 40, which is also connected to battery voltage, is connected to the CH1 input of the A/D converter 30 through an attenuator and low pass filter circuit comprised of resistors R2 and R3 and capacitor C3. The microcomputer 20 is then programmed to calculate the mLux switching threshold in accordance with the ratiometric change in the voltage signal at terminal 42 relative to the voltage signal at terminal 40. In this manner, the sensitivity control ratio is made independent of changes in the vehicle's battery voltage.

As previously noted, the state of the high beam lamps is controlled by the microcomputer 20 via the L1 output port. In particular, output line 32 is connected through a resistor R12 to the base of a Darlington transistor Q3. The collector of the Darlington transistor Q3 is connected to one terminal of a relay coil 34 which has its other terminal connected to the battery. The emitter of the Darlington transistor Q3 is connected through resistor R13 to ground. Accordingly, when a HI output signal is produced by microcomputer 20 on line 32, Darlington transistor Q3 is rendered conductive, thereby energizing relay coil 34 which controls the high beam lamps of the vehicle. In addition, it will be noted that the emitter of the Darlington transistor Q3 is also connected through a resistor R19 to the base of an N-P-N transistor Q4 which has its collector connected through a pull-up resistor R17 to Vcc and its emitter connected to ground. The signal off the collector of transistor Q4 is also provided to the G0 input of the microcomputer 20. With resistor R13 being a low value, high wattage resistor, such as $\frac{1}{2}$ ohm, $\frac{1}{4}$ watt, the signal provided to the base of transistor Q4 is proportional to the current flowing through the relay coil 34, and hence through the Darlington transistor Q3. Accordingly, if a short occurs in that relay circuit, the increased current flowing through resistor R13 when Q3 is on will render transistor Q4 conductive, thereby driving the signal provided to the G0 input to the microcomputer LO. If the input signal to the gate G0 ever goes LO while the L1 output on line 32 is HI, the microcomputer 20 is programmed to immediately terminate the HI output signal on line 32. This serves to provide short circuit protection for the Darlington transistor Q3.

Figure 7:
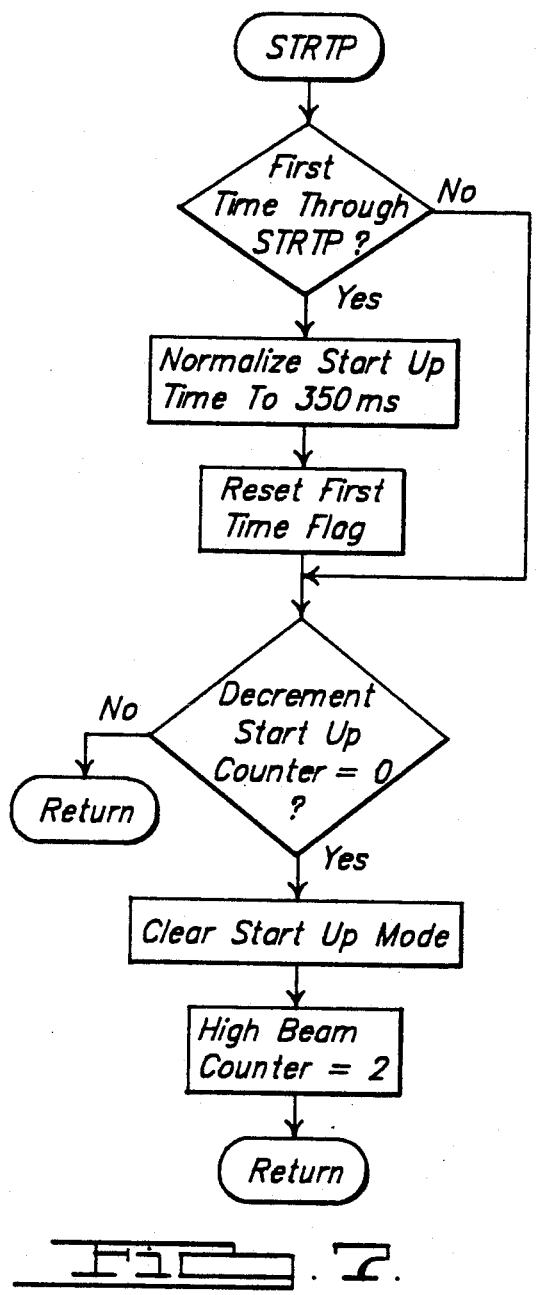
Figure 8:
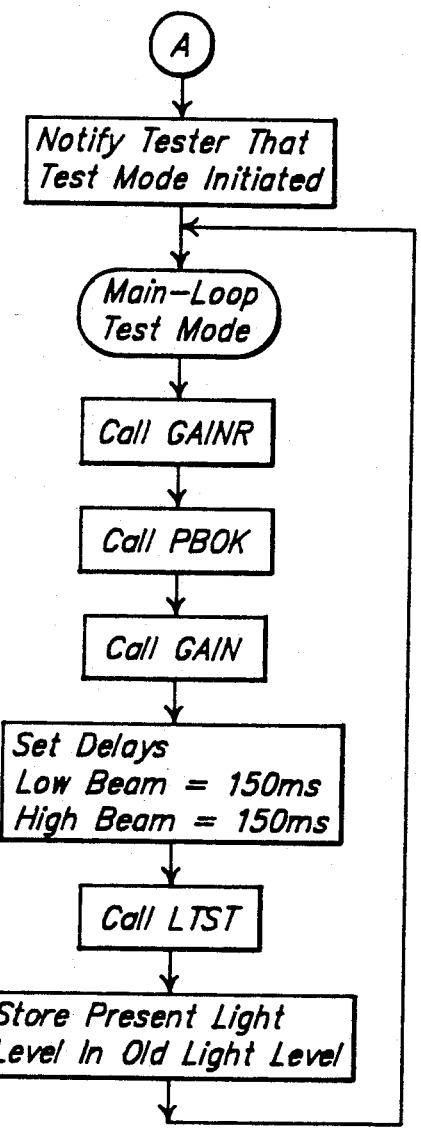

With reference to FIGS. 6-35, there is shown a set of flow charts outlining the programming of the microcomputer 20 shown in FIG. 4A in accordance with a preferred embodiment of the present invention. FIG. 6 illustrates a RESET routine which is performed by the microcomputer 20 each time the automatic headlamp dimmer system 10 is turned on. In the RESET routine 60, first RAM memory in the microprocessor 20 is cleared in step 62. The output port "L" is configured and the A/D converter 30 is turned off in step 64. In step 66, Ports "G" and "S" of the microprocessor 20 are configured. Also, in this step, the headlamps 18 are placed in low beam mode and the light amplifier 50 is set to high gain. The program then enters the Start-Up mode ("STRTP") which is shown in FIG. 7. Next, the program determines at decision point 70 whether the automatic headlamp dimmer module 14 is in the Test mode. The module 14 is placed in the Test mode by supplying a 100 HZ signal of amplitude greater than or equal to the battery voltage to the CH0 input of the A/D converter, and then performing a series of exercises to check the functionality of the system. The Test mode subroutine is shown in FIG. 8. If the system is not in the Test mode, the program proceeds to the Main Loop 72 shown on FIG. 9.

In the first step 74 of the Main Loop 72, the GAINR subroutine 74 shown in FIG. 10 is executed. In the GAINR subroutine 74, the three analog input ports, CH0, CH1, CH2 to the A/D converter 30 are read. In particular, in step 76, the wiper voltage off the potentiometer on line 42 (FIG. 2), which is controlled by the driver-selected setting of potentiometer 41, is read and stored as "PotR" in step 78. Likewise, the analog battery voltage at input channel CH1 coupled to the power terminal 40 is read in step 80 and stored in step 82 as "BATR". Finally, the analog light signal voltage from the output of amplifier 50 which is supplied via line 28 to input channel CH2 is read in step 84 and stored as "LightR" in step 86.

Figure 9:
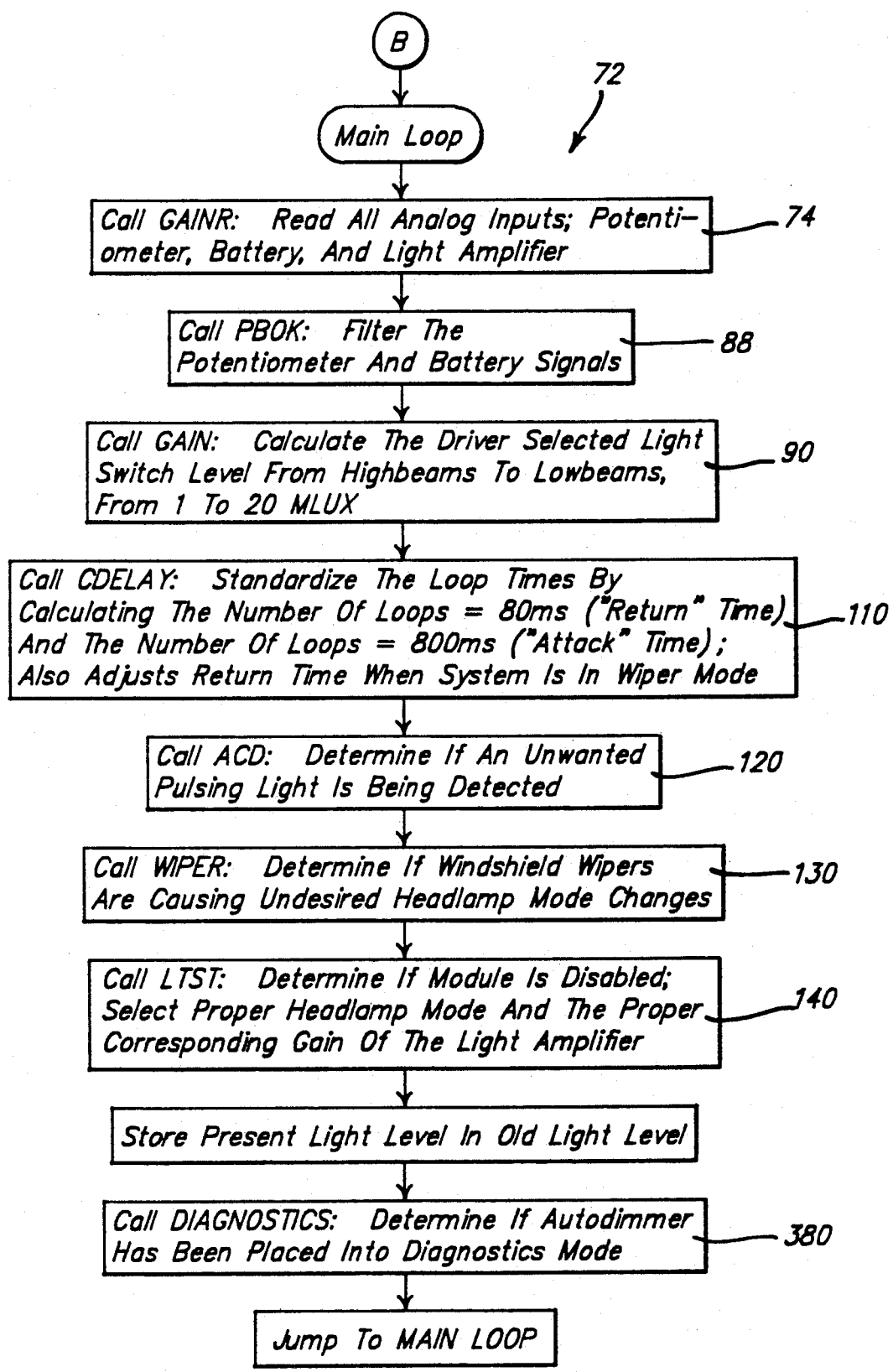
Figure 11:
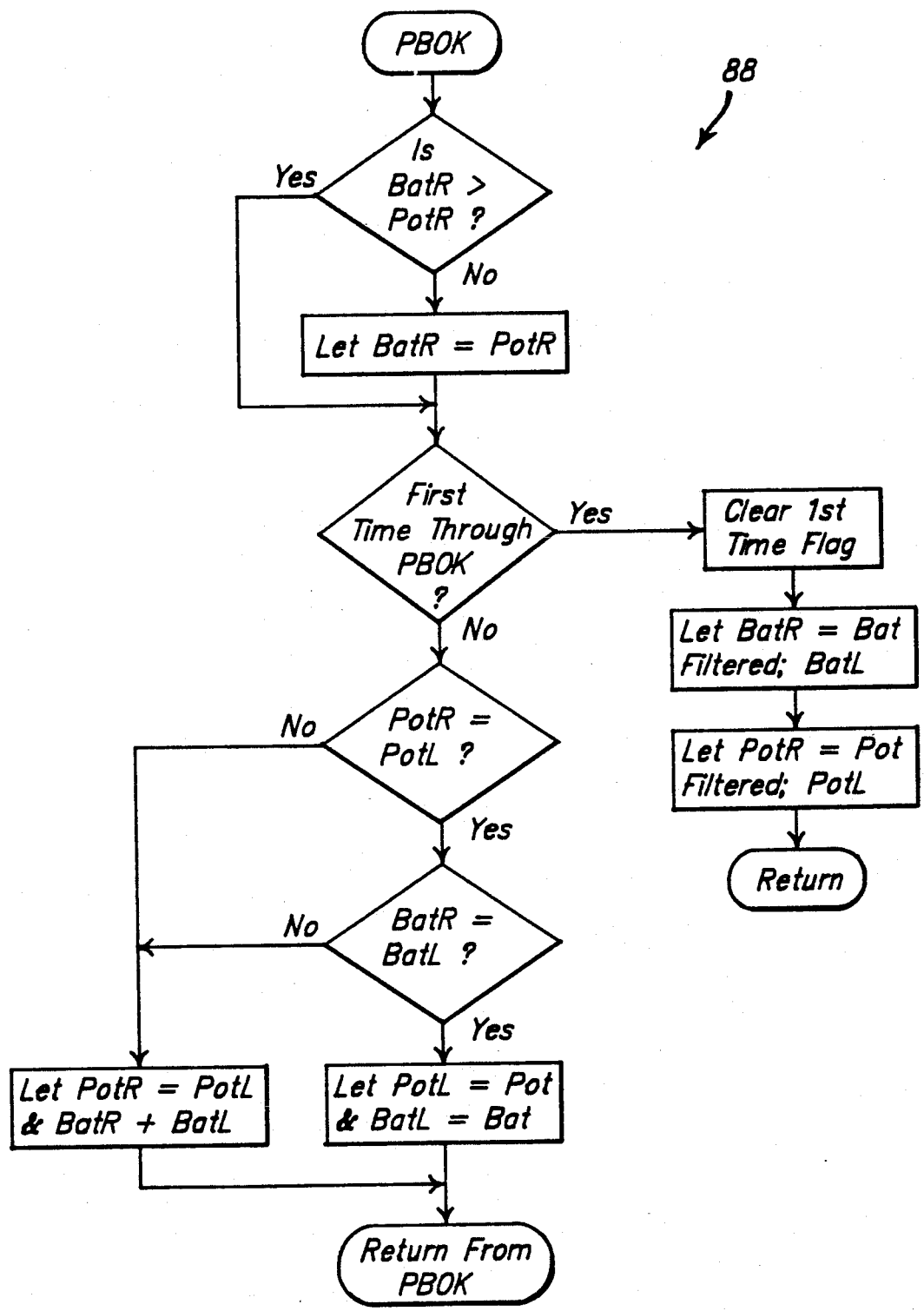
Figure 12:
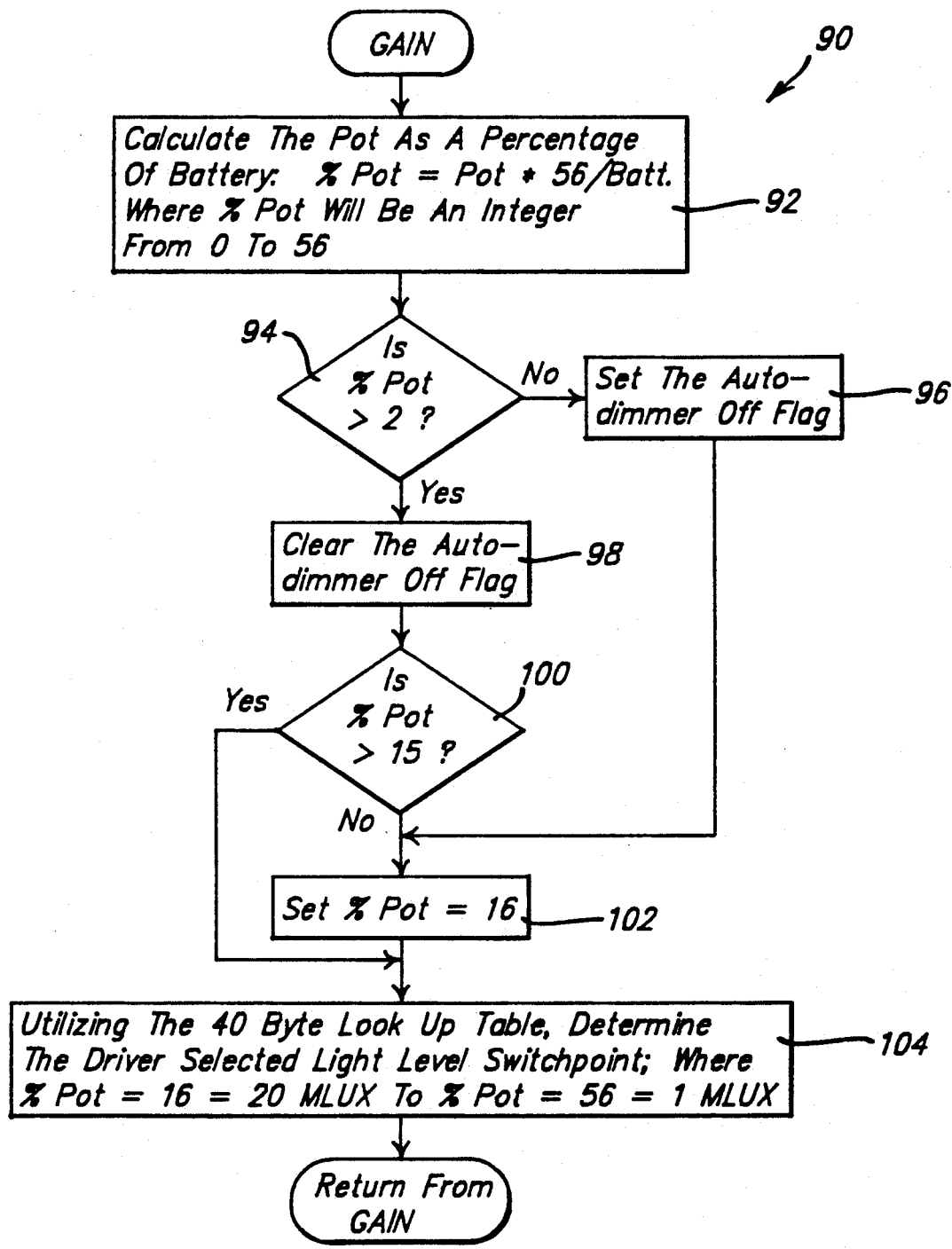
Figure 14:
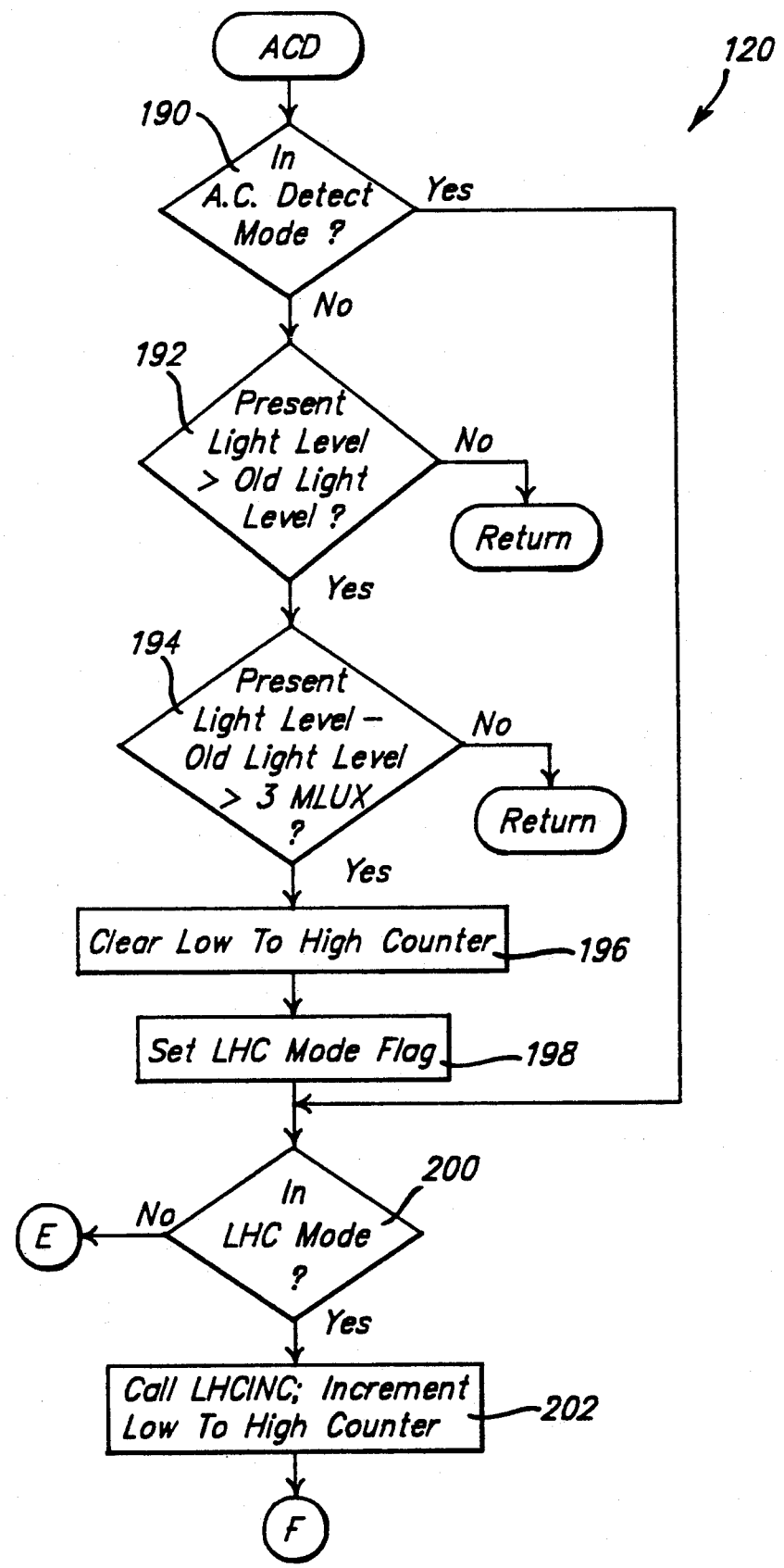

Returning to the Main Loop 72 in FIG. 9, the module then performs the PBOK subroutine 88 shown on FIG. 11. The PBOK subroutine 88 checks the values read for the battery (BATR) and the potentiometer (PotR) to ensure they are valid values by checking the credibility of the readings. The PBOK subroutine 88 also provides software filtering of the sampled signal values. The Main Loop 72 proceeds next to the GAIN subroutine 90. In general, the GAIN subroutine 90 calculates the driver selected sensitivity switch level which is adjustable between one and 20 mLux. As shown in FIG. 12, this subroutine first calculates the "Pot" value, or the potentiometer voltage at point 42 as a percentage of battery voltage in step 92. Step 94 determines if the auto dimmer module is ON by determining if the calculated "percent Pot" value is greater than two. If it is not, step 96 sets the auto dimmer OFF flag. If the "percent Pot" value is greater than two, indicating the module is ON, step 98 clears the auto dimmer OFF flag. Step 100 determines if the "percent Pot" value is greater than 15 and, if it is not, step 102 sets the "percent Pot" value at 16 which establishes a minimum "percent Pot" level. Step 104 then determines from the "percent Pot" value the corresponding driver selected light sensitivity switching point. As illustrated in FIG. 5, the sensitivity range of the system varies from a "percent Pot" value equal to 16, which corresponds to a switching point of 20 mLux, to a "percent Pot" value of 56, which corresponds to a switching point of one mLux. The microprocessor 20 derives these values in step 104 by means of a look-up table stored in internal ROM memory.

Figures 13A, 13B:
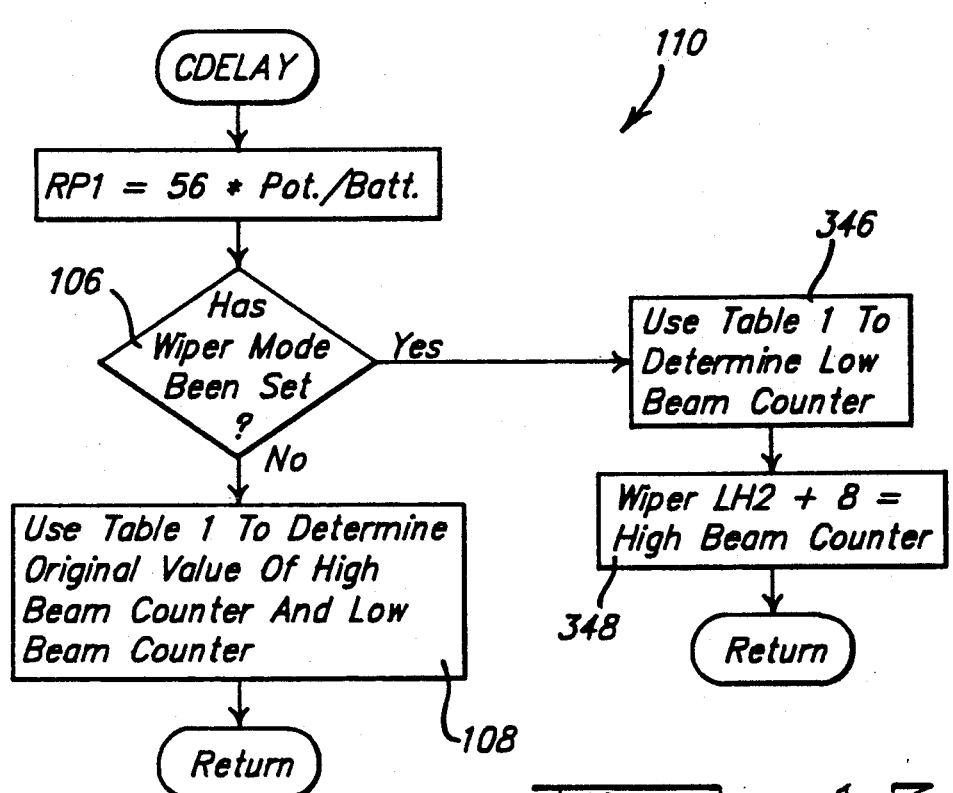
Figure 13:
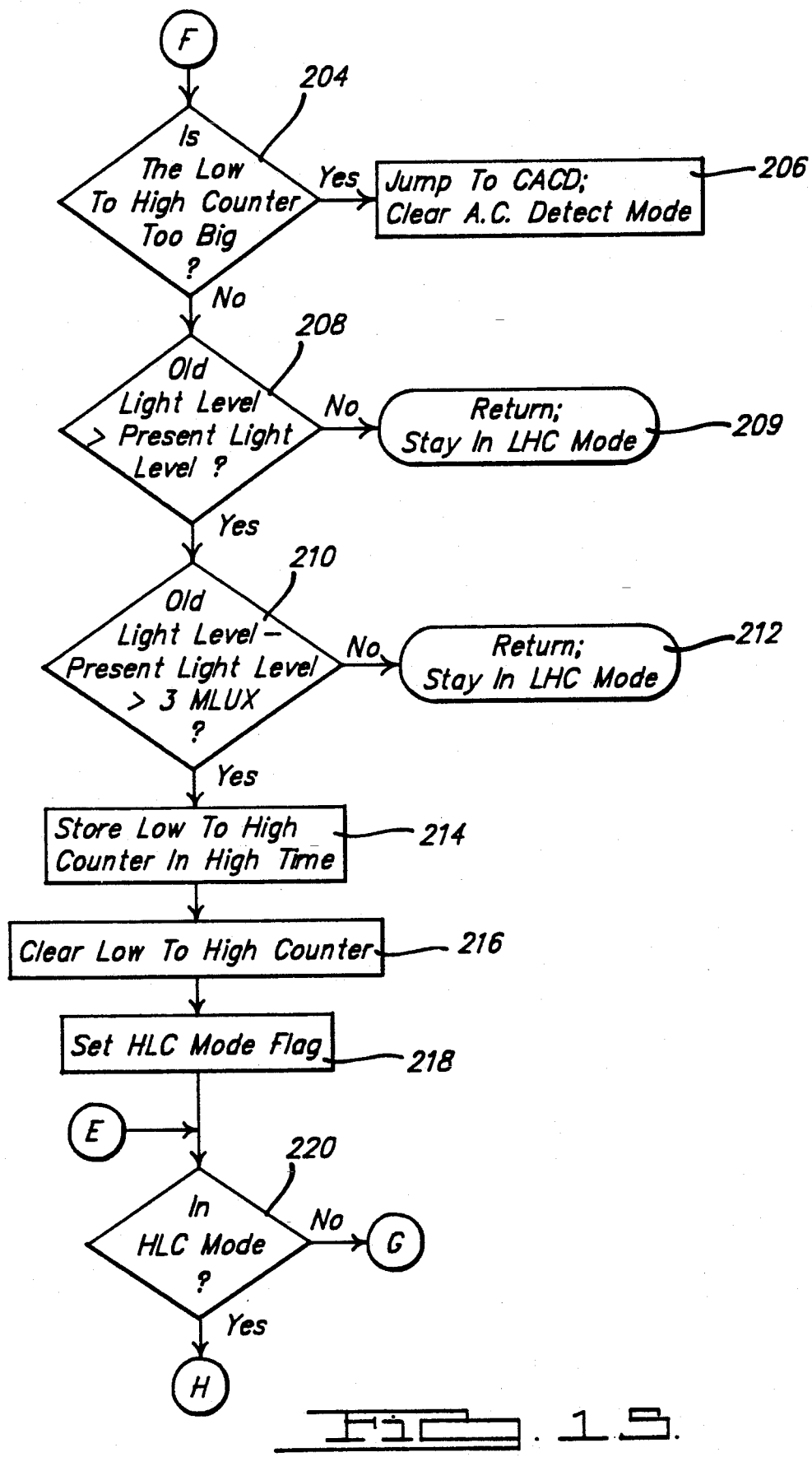
Figure 18:
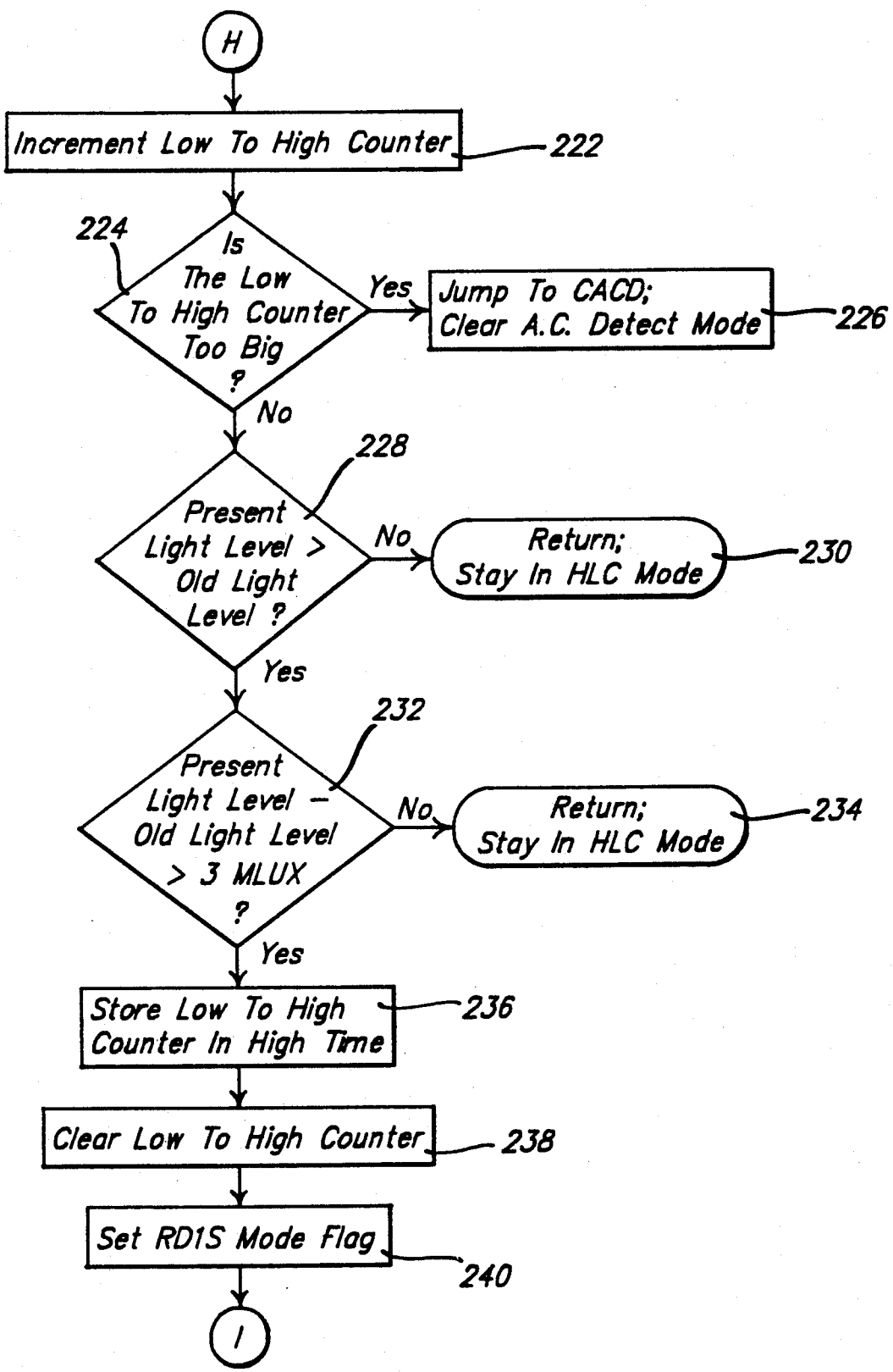
Figure 17:
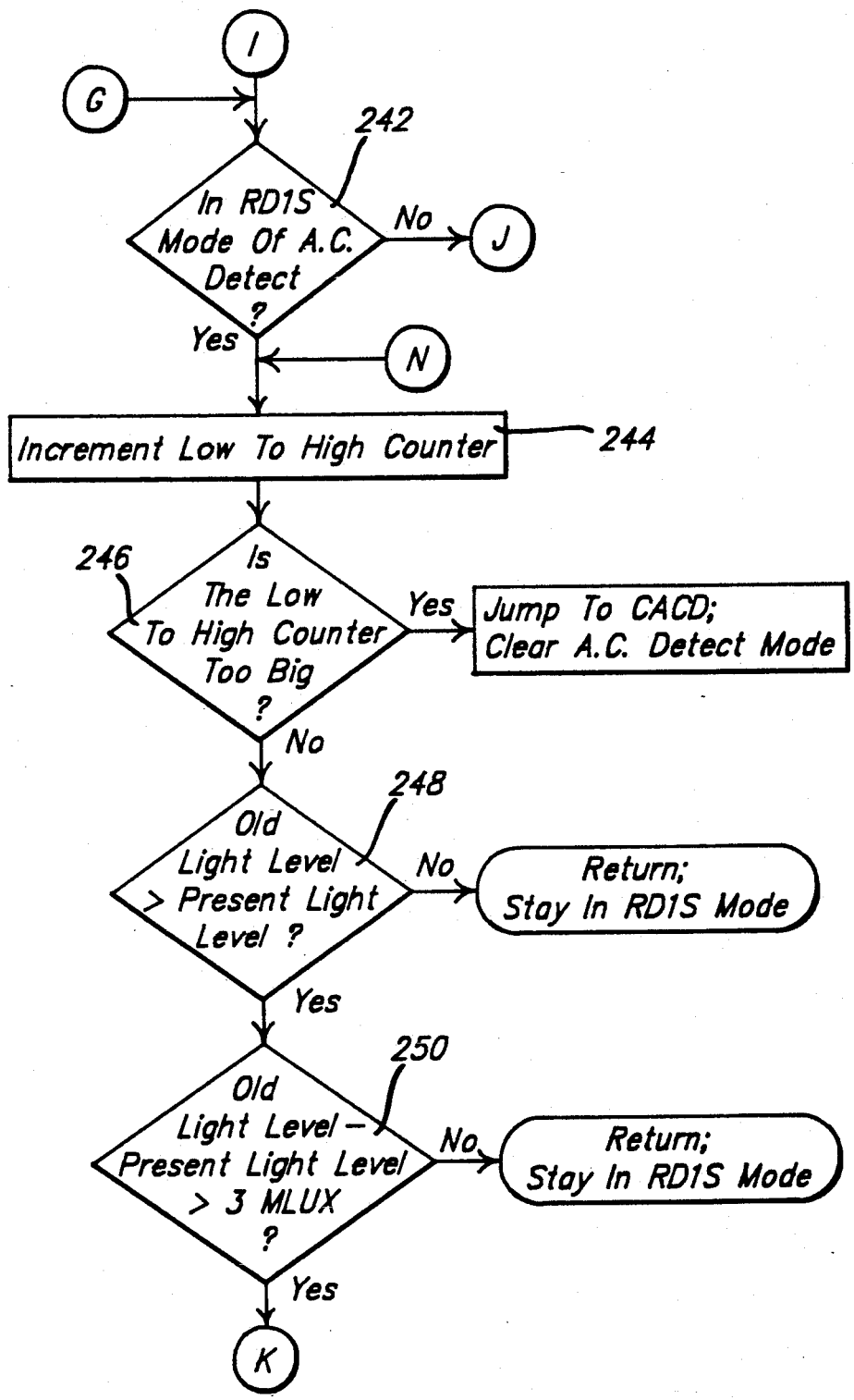
Figure 18:
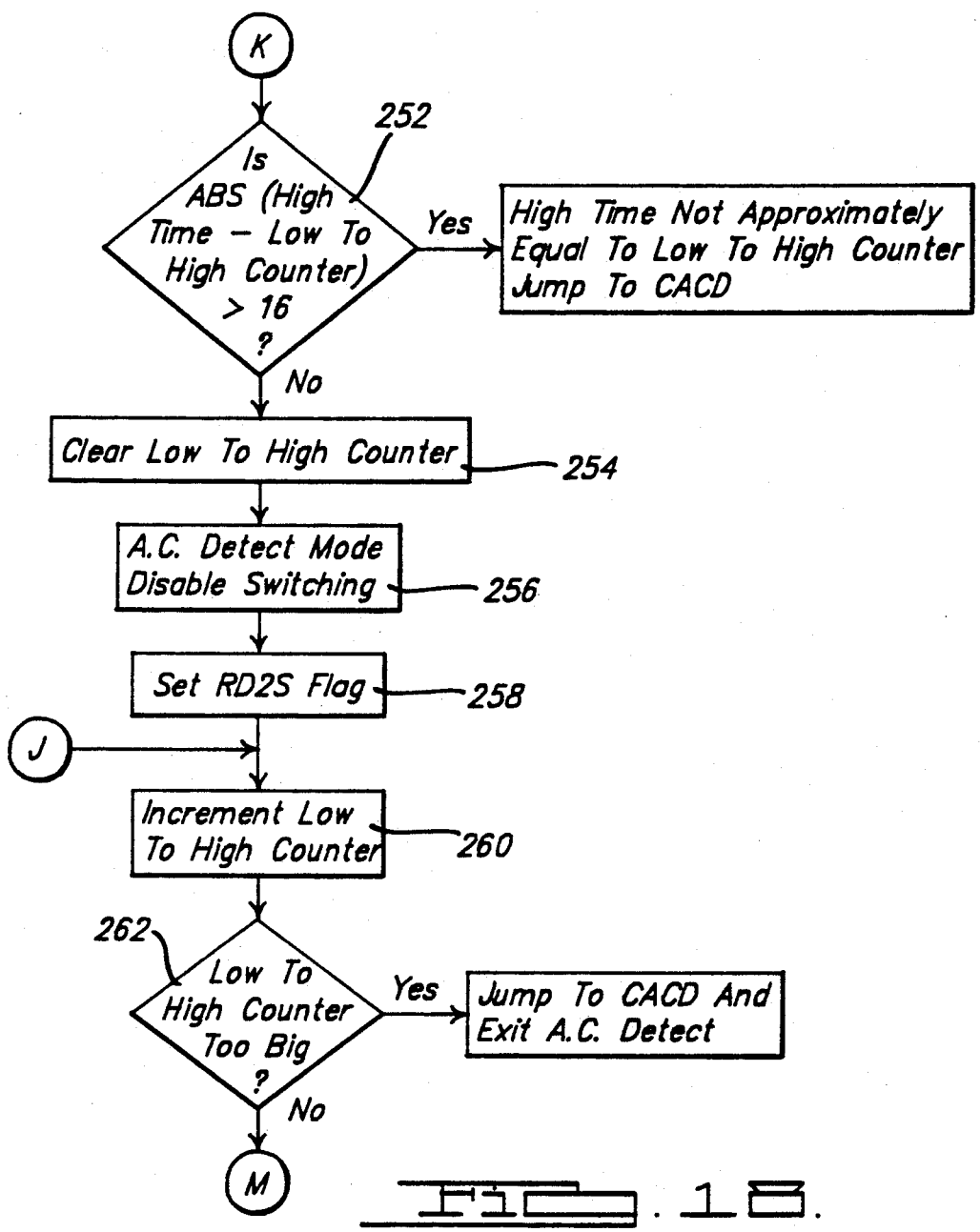
Figure 20:
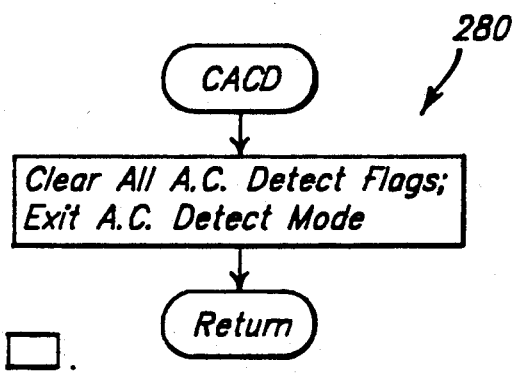
Figure 19:
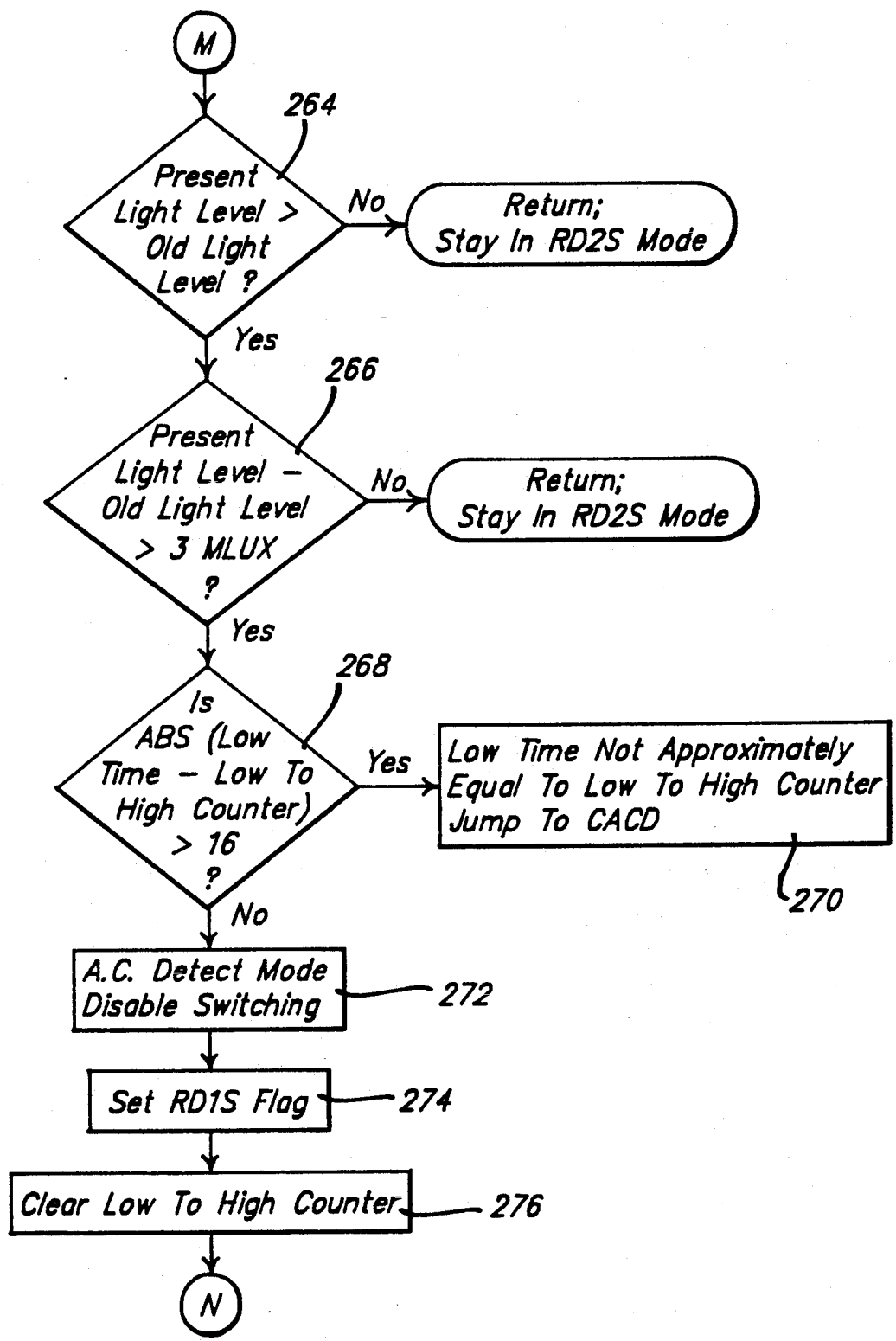
Figure 21:
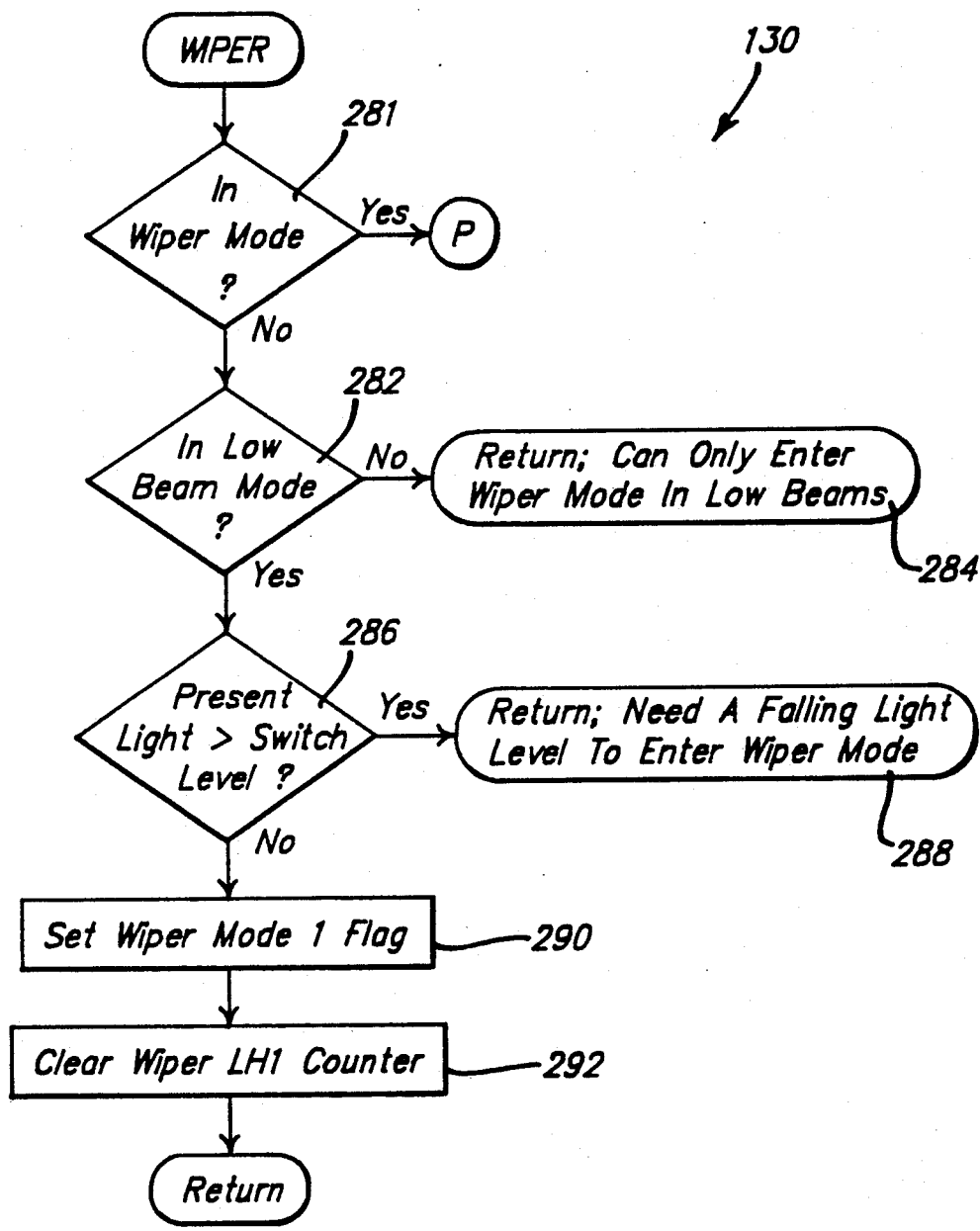
Figure 22:
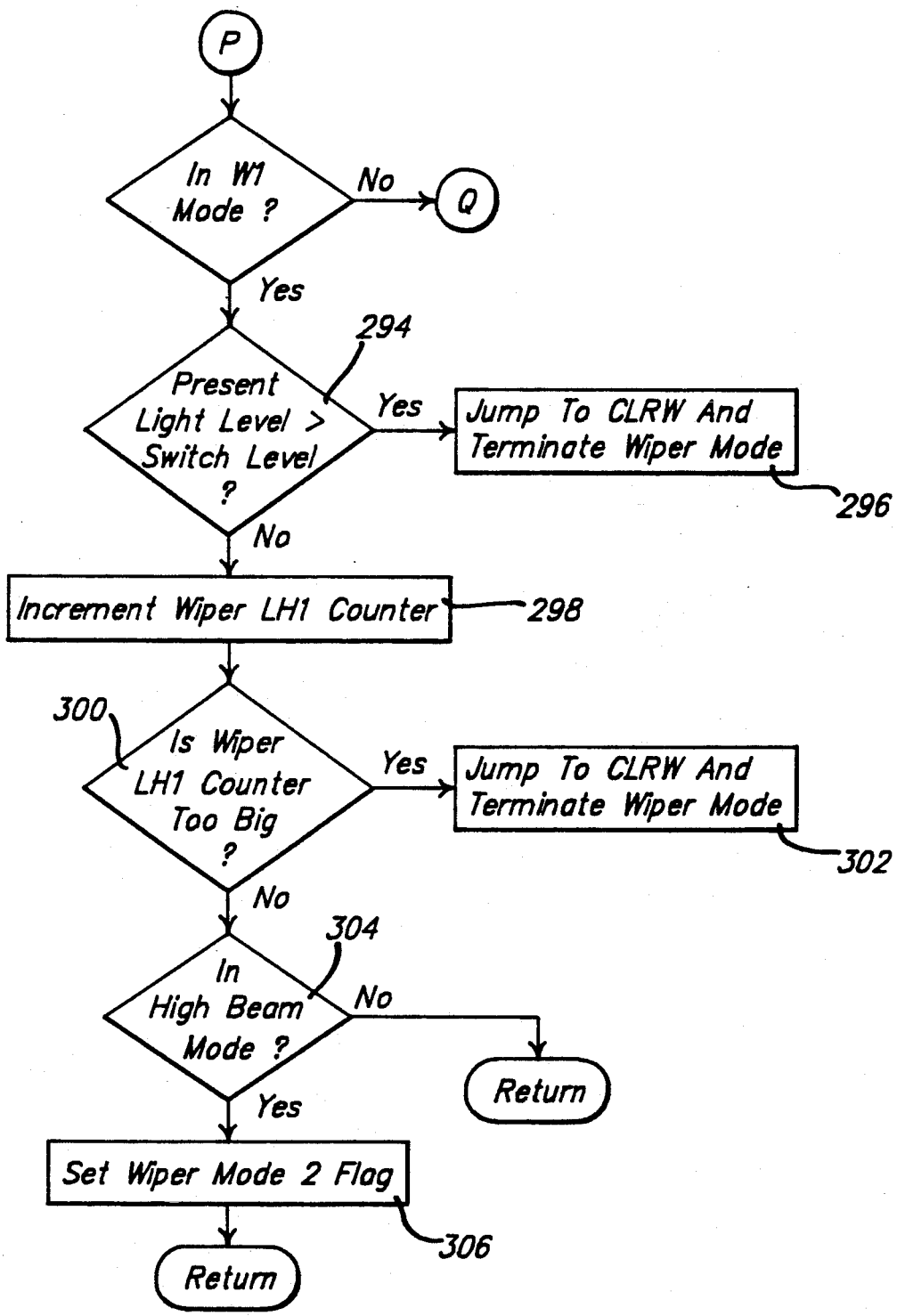
Figure 23:
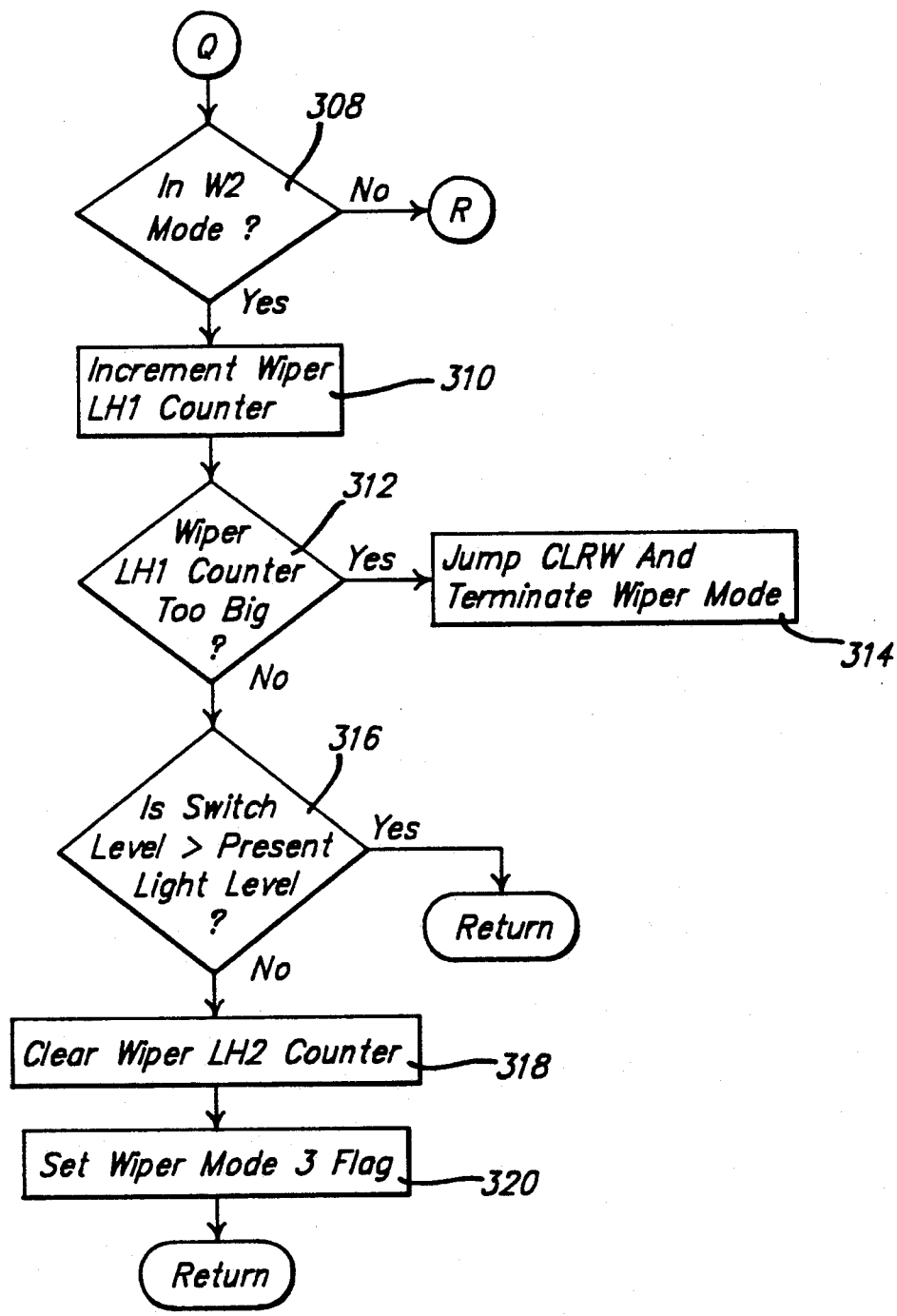
Figures 24, 25:
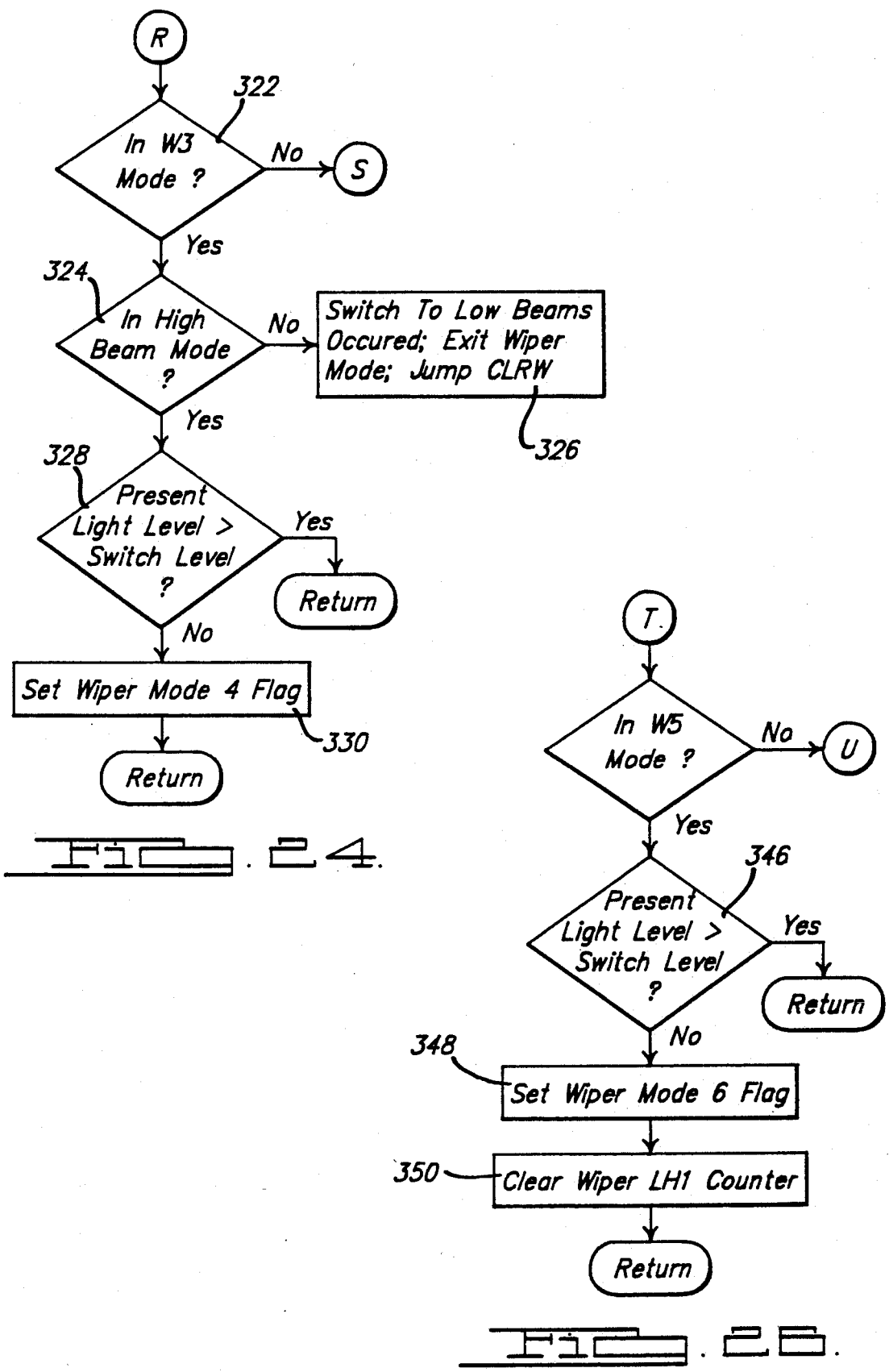
Figure 23:
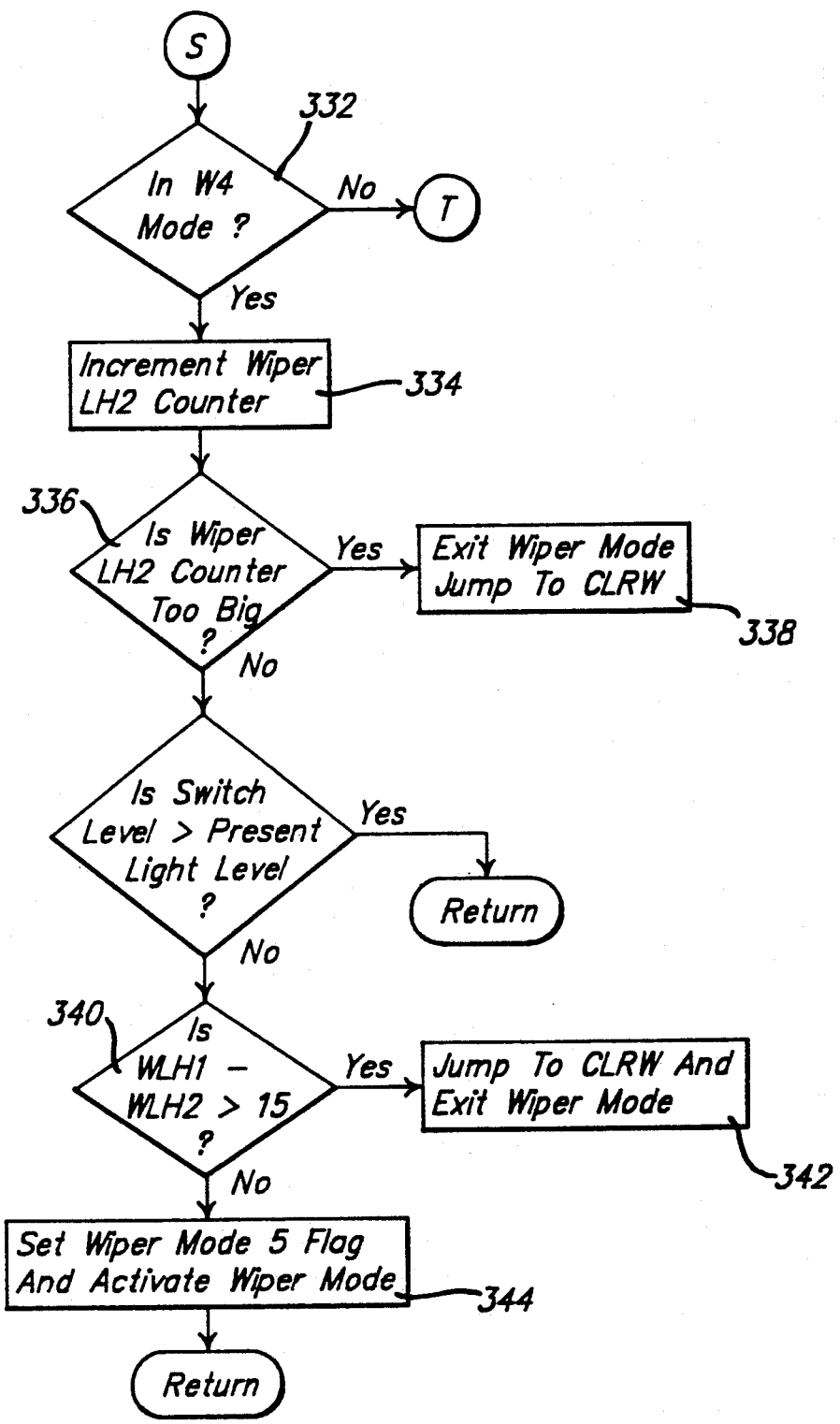

Next, the process returns to the Main Loop 72 to perform the "CDELAY" subroutine 110 shown in FIG. 13. The CDELAY subroutine 110 is used to establish the Attack time and Return time for the system. The Attack time is the period the system waits, following detection of the lights from another vehicle, before switching from high beam to low beam. The Return time is the period the system waits after the opposing vehicle passes, before switching back to high beam. In the preferred embodiment, 800 milliseconds is selected as the Attack time and 80 milliseconds is selected as the Return time. This Attack time has been found to provide an acceptable delay period without annoying the driver of the other vehicle. The short return time, however, is desirable to return to high beams as promptly as practical. It will be appreciated, however, that the speed of each process loop through the program will vary with the setting of the sensitivity potentiometer 41. Consequently, the number of program loops performed by the microprocessor 20 during the Attack time and Return time will vary accordingly. Thus, subroutine 110 determines the number of program loops corresponding to an 80 milliseconds delay and an 800 milliseconds delay using the table shown in FIG. 13. In particular, subroutine 110 uses Table 1 to determine the appropriate count values for presetting the high beam counter and low beam counter 108. Additionally, as will subsequently be described, the CDELAY subroutine 110 also adapts the Return time when the controller is in the Wiper mode.

Before proceeding with the general control scheme for the system, the Main Loop 72 of the program in the preferred embodiment implements two subroutines which examine the characteristics of the received light signal to determine if observed changes in the intensity of the light signal are attributable to extraneous conditions not associated with the presence or absence of lights from another vehicle and therefore should be ignored. As will subsequently be described in greater detail, the program performs an AC Detect ("ACD") subroutine 120 which detects the presence of a spurious flashing light signal and a Wiper subroutine 130 which recognizes when the windshield wipers have been turned on.

Figure 29:
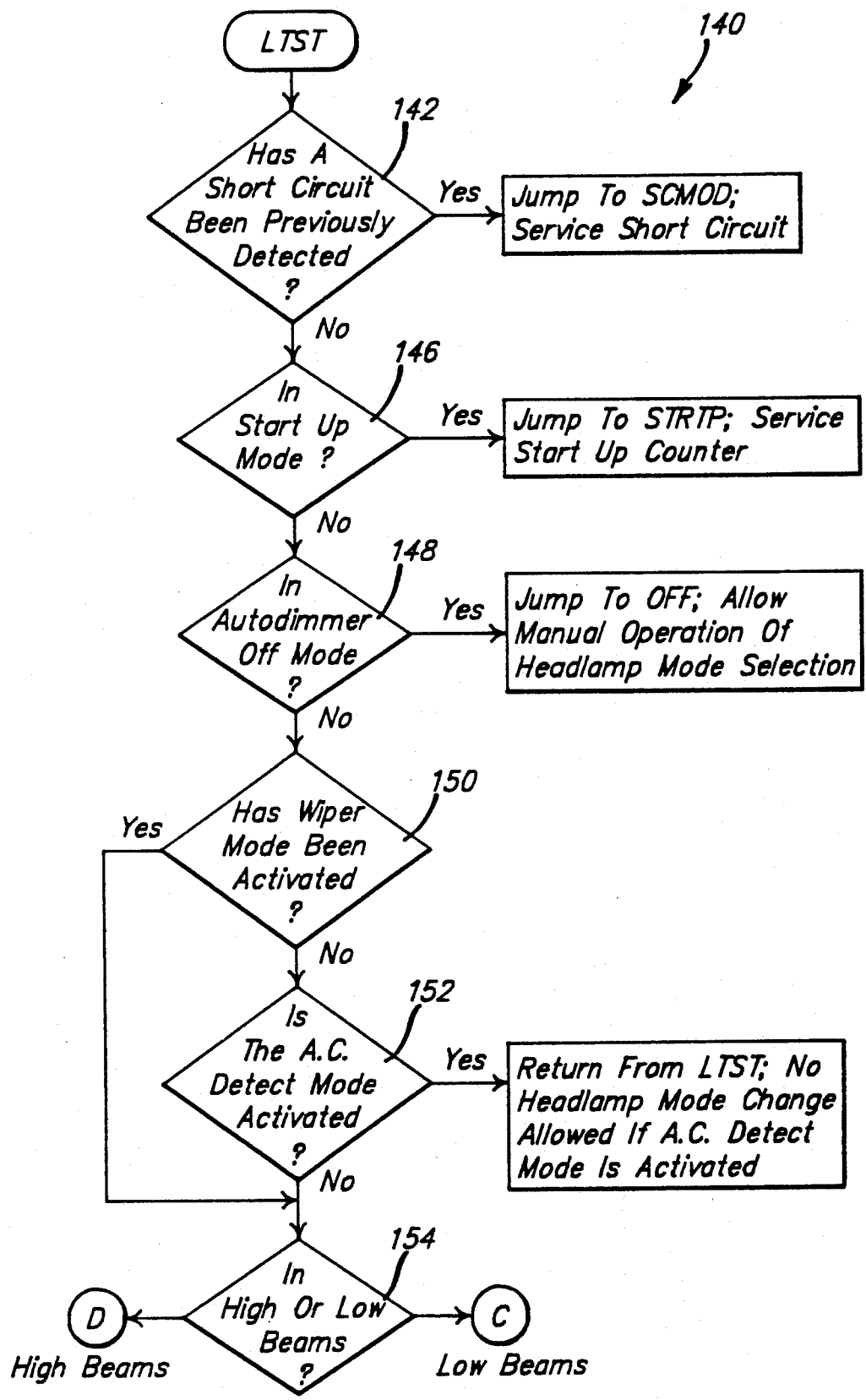

Following the implementation of these subroutines, the Main Loop 72 of the program proceeds to the LTST subroutine 140, which selects the proper headlamp mode and sets the appropriate corresponding gain of the light amplifier. With particular reference to FIG. 29, the LTST subroutine 140 initially checks for the presence of a short circuit 142, and branches to the Short Circuit mode subroutine ("SCMOD") shown in FIG. 32 if one is detected. Assuming the absence of a short circuit, the program then confirms in steps 146 through 152 that the controller is not in the Start-Up mode, OFF mode, Wiper mode, or AC Detect mode. Note that if the automatic dimmer control module 14 has been disabled by the operator, via switch 45 (FIG. 2), the program jumps to the OFF subroutine 155 shown in FIG. 33, which turns on the high beam lamps and sets the light amplifier to the low gain mode, before reverting the system to manual control of the headlamps.

Figures 30, 31:
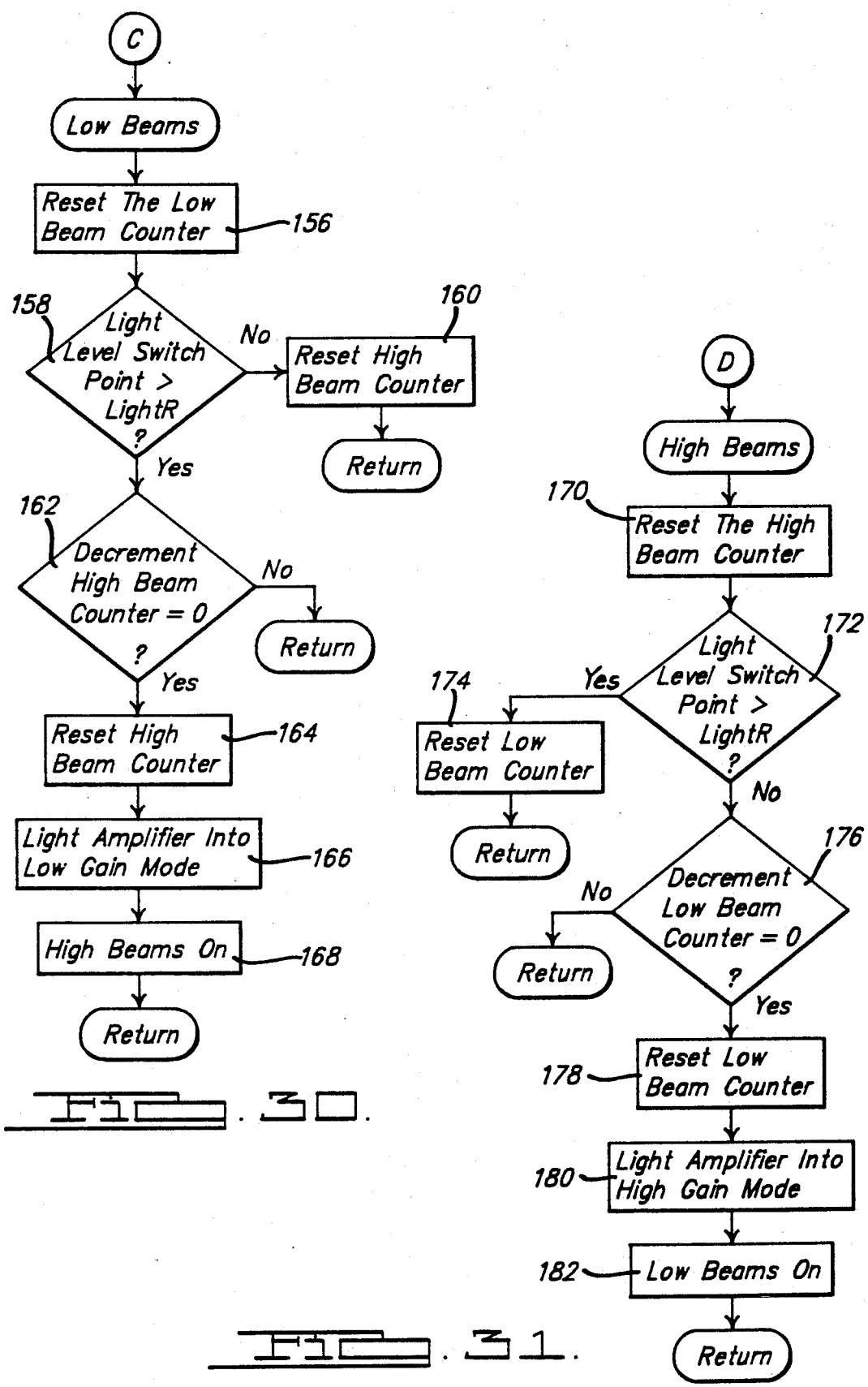
Figure 35:
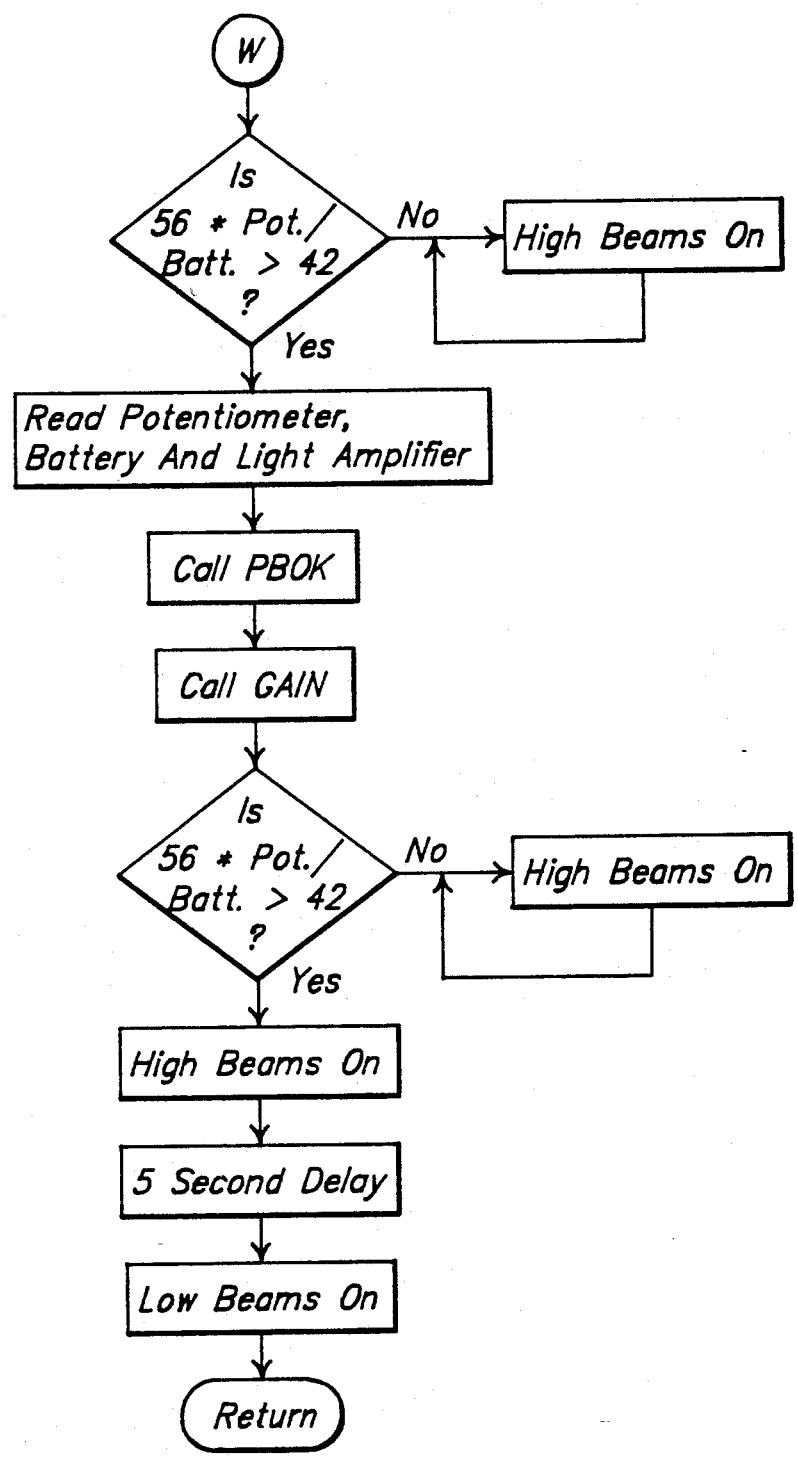

Returning to FIG. 29, the program then determines at step 154 whether the headlamps are on high beams or low beams. Turning to FIG. 30, if the low beams are on, the low beam counter is reset to the 800 milliseconds delay period 156, and the light level (LightR) checked to determine if it is less than the threshold switching point 158. If the incoming light signal is above the switching threshold, the high beam counter is reset to the 80 milliseconds delay period 160 and the program returns to the Main Loop. However, if the incoming light signal has dropped below the switching point, the program begins to time out the 80 milliseconds delay period by decrementing the high beam counter 162 returning to the main program loop. As long as the incoming light signal remains below the switching threshold, the program will continue to decrement the high beam counter each successive pass through the program loop until the high beam counter has counted down to zero, indicating that the 80 milliseconds delay period has timed out. When this occurs, the program resets the high beam counter in step 164, places the light amplifier into the low gain mode in step 166, and turns on the high beam lamps 168.

The succeeding pass through the program will result in the system branching from decision step 154 in FIG. 29 to the high beam mode shown in FIG. 31. In the high beam mode, the program initially resets the high beam counter to the 80 milliseconds delay period 170, and then checks the light level (LightR) to determine if the incoming light signal is greater than the threshold switching point 172. If the LightR signal is below the switching point, the low beam counter is reset to the 800 milliseconds delay period 174 and the program returns to the Main Loop. However, if the incoming light signal has risen above the switching point, the program begins to time out the 800 milliseconds delay period by decrementing the low beam counter 176 and returning to the main program loop. As long as the incoming light signal remains above the switching threshold, the program will continue to decrement the low beam counter each successive pass through the program loop until the low beam counter has counted down to zero, indicating that the 800 milliseconds delay period has timed out. When this occurs, the program resets the low beam counter in step 178, places the light amplifier into the high gain mode in step 180, and turns on the low beam lamps 182. Under normal operating circumstances, the present auto dimmer system will continue to cycle between the low and high beam modes in the manner described above in response to the presence or absence of lights from other vehicles within the field of view of the sensor.

However, as noted above, the preferred embodiment of the present automatic headlamp dimmer control module 14 is also adapted to recognize certain spurious light signals which might otherwise cause the system to respond in an undesirable manner. In particular, as shown in FIG. 9, the Main Loop performs an AC Detect (ACD) subroutine 120 which determines if a spurious flashing light is being received. The AC detect mode in general, looks for an input light signal having a high ("ON") time and a low ("OFF") time each less than two seconds, where the successive high times are approximately equal to each other and the successive low times are approximately equal to each other. These conditions are present when flashing lights of the type discussed above are observed by the automatic headlamp dimmer control module 14. Referring now to FIG. 36, the technique used to detect flashing lights by the AC Detect subroutine 120 is shown. The LightR signal is shown plotted as a function of time. Flashes of light are represented by high pulses of LightR having duration A and C, respectively. Between the flashes are low periods of duration B and D. The AC Detect subroutine 120 checks to see that each of the high periods, A and C, and each of the low periods, B and D, is less than two seconds in duration. In addition, the AC Detect subroutine determines whether the duration of high period A is approximately equal to that of high period C, and also whether the duration of low period B is approximately equal to that of low period D. Once these conditions are met, the program activates the AC Detect mode and switching between high and low beams is disabled.

In more detail, as shown in FIGS. 14–20, step 190 first determines if the system is already in the ACD mode. If it is not, the program at 192 determines if the present light level is greater than the old light level. If it is not, the system returns to the Main Loop 72 to proceed to the Wiper subroutine 130. If the present light level is greater than the old light level, step 194 determines if the difference between the present and old light levels is greater than three mLux. If it is not, the system ignores this minor increase, returns to the Main Loop 72, and proceeds to step 130. If the present light level is sufficiently greater than the old light level, then the low to high counter ("LHC") is cleared in step 196. The low to high counter counts the number of loops through the AC Detect subroutine 120 that are performed for the purpose of timing the "ON" time of the increased light signal. According, the program sets the low to high counter mode flag in step 198 and then increments the counter by one in step 202. Next, the program determines from the contents of the counter whether the "ON" time period of the observed signal (the A period of FIG. 34) is greater than 2 seconds 204. If affirmative, indicative of the fact that the increased light signal is not a flashing signal, the program proceeds at step 206 to the Clear AC Detect subroutine 280 shown in FIG. 20 and all AC Detect flags are cleared and the AC Detect mode is exited. The system then proceeds back to the Main Loop 72 and the Wiper subroutine 130.

Referring again to step 204 in FIG. 15, if however, the maximum number of cycles has not been exceeded, step 208 determines if the present light level is now less than the old light level. If it is not, then the system returns in step 209 to the Main Loop 72 and proceeds to the Wiper subroutine 120. This indicates that the received light signal has not yet begun to decrease in intensity. On the other hand, if it has, then step 208 produces a "YES" response and step 210 then determines if this old light level minus the present light level is greater than 3 mLux; that is, if the light level has diminished substantially. If it has not, step 212 proceeds back to the Main Loop 72 but stays in the low to high counter mode. If the difference is greater than 3 mLux, step 214 stores the contents of the low to high counter in the High Time register. The low to high counter is always running when the program is in AC Detect mode, being used to measure both low times and high times. The contents of the High Time register corresponds to the duration of the "ON" time of the first flash. This time is stored for later comparison with a subsequent flash to determine if the two "ON" times are substantially equal.

Next, the low to high counter is cleared and the high to low counter mode flag is set in steps 216 and 218, respectively, since the input light level has now decreased. Next, the program determines whether the system is still in the high to lower counter mode 220. If it is, the low to high counter is incremented by one 222 and the contents of the counter checked in step 224 to determine if the maximum number of loops has been reached. If affirmative, indicating that the decreased light level is not due to a flashing light signal, then step 226 jumps to the clear AC Detect subroutine 280 in FIG. 20, all AC Detect flags are cleared, and the AC Detect mode is exited and the system returns to the Main Loop 72. If as determined in step 224, the maximum low to high counter value has not been reached, it is then determined whether the present light level is now greater than the old light level 228. If it is not, then the program returns to the Main Loop 72 while staying in the high to low counter mode 234. Alternatively, if the present light level is now greater, then the incoming light has begun to increase and step 232 determines if this increase is greater than 3 mLux. If the difference is not greater than 3 mLux, it is ignored and the system returns to the Main Loop via step 234. If, on the other hand, the difference is greater than 3 mLux, then step 236 will store the low to high counter in the Low Time register as representative of the "OFF" time of the flash. This corresponds to the B interval in FIG. 36. Next, the low to high counter is cleared 238 and the RD1S mode flag is set 240. The RD1S mode is used to check how long the high light level has been present, and to compare it to the duration of the first, or initial high time.

Next, the program proceeds to step 242 which also is performed if step 220 determines that the system was not in the high to low counter mode. Step 242 determines if the system is in the RD1S mode of AC Detect. If it is, then the low to high counter is incremented 244 and the contents of the counter checked to determine if the maximum counter value has been reached 246. If it has, the program jumps to the Clear AC Detect routine 280 and the AC Detect flags and modes are cleared and the program returns to the Main Loop 72. If the maximum count value has not been exceeded, the program determines if the old light level now exceeds the present light level 248. If it does not, or if the difference is less than 3 mLux 250, the program returns to the Main Loop 72 while staying in the RD1S mode, in effect, ignoring this fluctuation in light level. However, if the change is greater than 3 mLUX, the program then determines in step 252 whether the absolute value (ABS) of the High Time minus the low to high counter is greater than 16. If it is, then the previously set initial High Time is not approximately equal to the newly detected High Time in a subsequent pulse. This indicates that, in FIG. 36, the A and C intervals are not equal. This means that periodicity in the incoming light signal is not present. Accordingly, the program branches to the Clear AC Detect subroutine 280. If, on the other hand, the two measured time periods are approximately equal, then the low to high counter is cleared 254 and the system is put in the AC Detect mode 256 which disables the microprocessor 20 from switching the headlamps between high and low beams. It should be noted that the present invention is adapted to analyze the periodicity of an incoming signal even before the intensity of the flashing light exceeds the switching threshold. Thus, when a flashing light is approached, the system detects its presence before it is close enough to cause the system to erroneously switch to low beams.

The program next proceeds to the RD2S mode which functions in an equivalent manner to the RD1S mode to identify the presence of a low light level, determine how long it has been present, and compare the period to the low time standard previously set. That is, the RD2S mode determines whether the B and D signals shown in FIG. 36 are each less than two seconds in duration and approximately equal in duration. In particular, the RD2S flag is set 258 and the low to high counter incremented 260. The program then determines at step 262 whether the contents of the counter have exceeded the maximum delay period (i.e., the number of program loops corresponding to two seconds). If it has, the system then proceeds to the Clear AC Detect subroutine 280, since a light signal that does not switch from low to high within two seconds is not considered an erroneous flashing signal. If, on the other hand, the contents of the counter are less than the allowable maximum, the program next determines if the present light level is greater than the old light level 264. If not, the program returns to the Main Loop 72 while staying in the RD2S mode. If the present light level is greater, however, step 266 determines if the difference is greater than 3 mLux. If the change is less than 3 mLux, the change is ignored and the program returns to the Main Loop 72 while staying in the RD2S mode. However, if the change is greater than 3 mLux, step 268 determines whether the absolute value (ABS) of the Low Time minus the low to high counter (current low time) is greater than 16. If it is, indicating a lack of periodicity in the light signal, then the system jumps at step 270 to the Clear AC Detect subroutine 280 and proceeds to the Main Loop 72. Alternatively, if the difference is not greater than 16, indicating that the duration of the present low light signal is approximately equal to the duration of the low time standard (i.e., B≈D, FIG. 36), then the system remains in the AC Detect mode 272 to prevent the system from switching between high and low beams in response to the identified flashing signal. The program then returns to the RD1S mode by setting the RD1S flag 274 and clearing the low to high counter 276. Thereupon, the program returns to step 244 shown in FIG. 17 and repeats the steps in the RD1S mode. The program will remain in the AC Detect mode and continue to cycle between the RD1S and RD2S routines as long as the criteria for a spurious flashing light signal is satisfied. However, once any of the criteria is absent, the program exits the AC Detect mode, clears all AC Detect flags, and returns to the main program.

The WIPER subroutine 130 is performed next in the Main Loop 72, and is shown in detail in FIGS. 21-28. In general, the WIPER subroutine 130 determines whether the light level is being interrupted by the sweep of the windshield wipers. This is accomplished by looking for a pair of low signals approximately equal in duration and separated by less than 800 ms. This type of light signal pattern is shown in FIG. 37 which is a diagram of the LightR signal as a function of time. Low signals T, V, X and Z represent interruptions by the wipers. The WIPER subroutine initially detects whether the pair of low signals T and V are approximately equal in duration and whether the duration of the high signal U separating the pair is less than the Attack time of 800 msec. If these conditions are satisfied, the system activates the Wiper mode to prevent the system from erroneously responding to the interruptions in the light signal caused by the sweep of the wipers. This is accomplished in the present embodiment by increasing the Return time from 80 msec. to a value greater than the duration of the low signal T, preferably by at least 20 msec. The system will remain in the Wiper mode as long as the duration of subsequently observed low pulses X, Z, etc. is approximately equal to the duration of the initially observed low pulses T and V. In this manner, the system will be prevented from erroneously switching between low beam and high beam in response to the action of the wipers.

The WIPER subroutine 144 implements these functions in the flow-charts shown in FIGS. 21-28. Initially, the subroutine determines if the automatic headlamp dimmer control module 14 is in the low beam mode 282. If it is not, step 284 returns the program to the Main Loop 72 as the Wiper mode can only be entered while the system is in the low beam mode. That is, the spurious response to the wipers will only occur when the system is in the low beam mode (due to the previous detection of an above threshold light signal from another vehicle), and further when the wiper blade momentarily blocks the incoming light signal to the sensor causing the system to switch back to high beams in response. If the system is in the high beam mode, blocking of incoming light by the wipers will have no adverse effect.

If the system is in the low beam mode, the program next determines if the present light level is greater than the threshold switching level 286. If it is, step 288 returns the system to the Main Loop 72. This occurs because operation of the wipers results in a blocking of the incoming light beam, in which case the present light level should be below the switching level and not above. Accordingly, if the present light level is indeed less than the threshold switching level, then the wiper mode "1" flag is set 290 and the wiper LH1 counter is cleared 292. This counter is used to time the initial low period of interruption ("T" in FIG. 37) in the light signal. Next, the system returns to the Main Loop and on the subsequent pass through the Main Loop returns to step 281 (FIG. 21) which determines if the system is still in the Wiper or W1 mode. The W1 mode indicates that the system has detected a possible first wiper interruption. If the system is in the W1 mode, step 294 confirms that the present light level is still below the threshold switching level. If it is not, this indicates that the falling light level has ended too soon to be a wiper interruption and the program jumps 296 to the Clear Wiper mode subroutine 370 shown in FIG. 28, which clears all Wiper Mode flags, exits the Wiper mode and returns to the Main Loop 72. However, if the present light level remains below the threshold switching level, then the LH1 counter is incremented 298 to continue to time the interruption. If the LH1 counter ever exceeds a preselected maximum count total 300 indicative that the low signal interval is longer than one attributable to a wiper interruption, the program jumps 302 to the Clear Wiper subroutine 370 (FIG. 28), the Wiper mode is exited, and the system returns to the Main Loop 72.

Assuming the LH1 counter does not exceed the preselected maximum, the program proceeds to Wiper Mode 2 when the headlamps switch to high beam mode after the 80 msec. Return time has elapsed since the onset of the low signal. In other words, since a typical wiper interruption is longer than the 80 msec. Return time, the control module 14 will erroneously respond to the initial low signal (T in FIG. 37) and switch back to high beams. This occurs due to the fact that the program continues to perform the LTST subroutine 140 (FIGS. 29-31) each pass through the Main Loop 72 as described above. The switch to high beams is detected at step 304 in the Wiper subroutine and the Wiper Mode 2 flag is set 306 before returning to the Main Loop 72.

Upon the subsequent path through the main program loop, the system, now being in Wiper Mode 2, will reach step 308 and continue to time the duration of the low signal by incrementing the LH1 counter in step 310. The count total in the LH1 counter is again checked to determine if it has exceeded the preselected maximum 312. If it has, the program branches 314 to the Clear Wiper Mode subroutine 370 and returns to the Main Loop 72. If, however, the LH1 counter has not exceeded the preselected maximum, the program confirms that the threshold switching level is still greater than the present light level 316 (indicating that the light interruption is still present), before returning to the Main Loop 72. Alternatively, if it is determined that the interruption is over, the program enters the Wiper Mode 3 by clearing the LH2 counter 318, setting the "Wiper Mode 3" flag 320, and returning to the Main Loop 72. This stage corresponds to the end of the T interval and the beginning of the U interval in FIG. 37. At this point, the contents of the LH1 counter defines the duration of low signal T.

In the Wiper Mode 3, the program essentially confirms that the high beam lamps are still on and waits for the next light interruption. If, however, the next light interruption does not commence within 800 msec.—the Attack time of the system—the program will branch to the Clear Wiper Mode subroutine at step 326 and return to the Main Loop 72. In other words, if the duration of period "U" in FIG. 37 is greater than 800 msec., the system will have responded to the high level light signal and switched back to low beams. Consequently, step 324 in the WIPER subroutine effectively serves to time the duration of the high light signal U to ensure it is less than 800 msec. A duration of more than 800 msec. is presumed to be outside the expected pattern of normal wiper operation.

Assuming the system is still in the high beam mode when the next light interruption is detected by virtue of the present light level dropping below the threshold switching level 328, the program thereupon enters "Wiper Mode 4" by setting the Wiper Mode 4 flag 330 and returning to the Main Loop 72. The function of Wiper Mode 4 is similar to Wiper Mode 2 in that the duration of the light interruption is measured by incrementing the LH2 counter 334 each pass through the program loop. That is, Wiper mode 4 measures the V interval shown in FIG. 37. If the duration of the interruption is greater than the preselected maximum value 336, the program exits the Wiper mode 338. If, however, the duration of the interruption is less than the preselected maximum, the measured period is compared in step 340 with the measured period of the first interruption to determine if the two periods are substantially equal (i.e., whether the difference between the two count totals, WLH1−WLH2, is less than 15). If the two interruption periods are not substantially of equal duration, then the program returns to the Main Loop 72 and the Wiper mode is exited 342. If, however, the two measured interruption intervals are substantially equal, the system concludes that the interruptions are due to the operation of the windshield wipers and consequently the drop-outs in the light signal are thereafter ignored. This occurs at step 344 in the program by activating the Wiper Mode which, as previously noted, serves to increase the Return time of the system to a value approximately 20 msec. greater than the observed duration of a wiper interruption. In particular, it will be recalled that one of the subroutines performed by the Main Loop program 72 is the CDELAY subroutine 110 which sets the Attack and Return time delays for the system. Returning momentarily to FIG. 13, on the next pass through the Main Loop 72 when the CDELAY subroutine 110 is implemented, the program will accordingly branch at decision point 106 now that the system is in Wiper Mode, and use Table 1 to set the Attack time only, at step 346. The Return time, at step 348, is then set equal to the contents of counter LH2 (which corresponds to the measured duration of low signal V in FIG. 37) plus eight—the additional eight counts adding approximately 20 msec. to the Return time delay period.

With the system in Wiper Mode, the Wiper subroutine now cycles between Wiper Mode 5 and Wiper Mode 6. Wiper Mode 5 corresponds to the high light level periods (W, Y, etc. in FIG. 37) and Wiper Mode 6 corresponds to the low light level periods (X, Z, etc. in FIG. 37). In Wiper Mode 5, the program essentially waits for the next light interruption. Since a high light level period (e.g., W in FIG. 37) can be quite lengthy, particularly if the wipers are operating in intermittent mode, no attempt is made to monitor or measure this time period.

Once the next drop in light level below the threshold is detected, in step 346, the program enters Wiper Mode 6 348 and clears the LH1 counter 350. In Wiper Mode 6, the subroutine measures the duration of the low light signal by incrementing the LH1 counter 356 each pass through the program. As in Wiper Mode 2, if the LH1 count total ever exceeds a preselected maximum amount 358, the Wiper mode is exited and the program jumps 360 to the Clear Wiper Mode subroutine 370 shown in FIG. 28. Upon termination of the low light signal period, as detected at step 354, the measured duration, as determined from the contents of counter LH1, is compared 362 to the period of the initial pair of low light signals (T and V in FIG. 37), as determined by the contents of counter LH2. If substantially equal, the subroutine returns to Wiper Mode 5 364 and the LH1 counter is again cleared 366. If the two count totals are not substantially equal, the Wiper Mode is exited and the program branches 368 to the Clear Wiper Mode subroutine 370. In other words, now that the system has detected that the windshield wipers are on, the program continues to look for the occurrence of additional light interruptions which are of a duration less than the preselected maximum and substantially equal to the initially observed pair of interruptions. As long as these conditions maintain, the system will stay in the Wiper mode and ocntinue to ignore the light interruptions. However, once either of these conditions fails, the program exits the Wiper Mode, clears all of the Wiper Mode flags, and returns to the main program.

Alternatively, detection of the activation of the windshield wipers could be accomplished through hardware instead of software. For example, a signal line could be supplied directly from the windshield wiper system to the microprocessor to signal the microprocessor when the wipers have been turned on. However, the additional cost associated with this alternative approach makes it less preferred.

Finally, it will be noted that the preferred embodiment of the present automatic headlamp dimmer control module 14 includes a diagnostics capability which is accessed from the main program loop at step 380 in FIG. 9. If the control module has been placed in the Diagnostics Mode, the program will branch to the Diagnostics subroutine 380 set forth in FIGS. 34 and 35. In general, the Diagnostics subroutine automatically tests the various functions of the control module to determine the identity of a problem.

While the above description constitutes the preferred embodiments of the invention, it will be appreciated that the invention is susceptible to modification, variation and change without departing from the proper scope and fair meaning of the following claims.

What is claimed is:

1. A system for automatically controlling the energization of the high beam headlamps of a vehicle in accordance with the presence or absence of light from the headlamps or taillamps of another vehicle, wherein the headlamps of the vehicle comprise conventional unfiltered incandescent lamps that emit light in the visible and infrared regions of the light spectrum, comprising:
   sensor means including a light sensor for producing an electrical signal related to the light impinging on said light sensor, said sensor means being responsive to light in the infrared region of the light spectrum and substantially nonresponsive to light in the visible region of the light spectrum,
   control means responsive to said electrical signal from said sensor means for controlling the energization of the high beam headlamps of the vehicle in accordance with a characteristic of said electrical signal.

2. The system of claim 1 wherein said sensor means is adapted to produce an elecrical signal whose magnitude varies in accordance with the intensity of the light received in the infrared region and further wherein said characteristic comprises the amplitude of said electrical signal.

3. The system of claim 2 wherein said control means is adapted to deenergize the high beam headlamps when the intensity of infrared light impinging on said light sensor exceeds a first predetermined level.

4. The system of claim 3 wherein said control means is adapted to energize the high beam headlamps when the intensity of infrared light impinging on said light sensor is less than a second predetermined level less than said first predetermined level.

5. The system of claim 4 wherein said control means includes an amplifier having associated therewith a gain, that is connected to receive said electrical signal from said sensor means for amplifying said electrical signal, comparator means for comparing said amplified electrical signal with a threshold signal, and processor means for varying the gain of said amplifier in accordance with the state of the high beam headlamps of the vehicle.

6. The system according to claim 5 wherein said processor means is adapted to set the gain of said amplifier at a first value when the high beam headlamps are energized and at a second level lower than said first level when the high beam lamps are off.

7. The system according to claim 1 wherein said light sensor comprises a photodetector and said sensor means includes optical filtering means for blocking visible light from impinging upon said photodetector.

8. The system according to claim 7 wherein said optical filtering means comprises a coating opaque to visible light that is applied directly to said photodetector.

9. The system according to claim 8 wherein said photodetector comprises a silicon photodetector that is responsive to light in the visible and infrared regions of the light spectrum.

10. The system according to claim 5 wherein said control means further includes sensitivity adjustment means for adjusting the level of said threshold signal.

11. The system of claim 10 wherein said sensitivity adjustment means and comparator means operate independently of said variable gain amplifier such that the ratio of the threshold intensity level of light impinging on said light sensor required to energize said high beam lamps relative to that required to deenergize said high beam lamps remains substantially constant regardless of adjustments to the level of said threshold signal.

12. A system for automatically controlling the energization of the high beam headlamps of a vehicle in accordance with the presence or absence of light from the headlamps or taillamps of another vehicle, comprising:
   sensor means comprising a photodetector having applied directly thereto a coating opaque to visible light and transparent to infrared light for producing an electrical light signal related to the light impinging on said photodetector such that said sensor means is responsive only to light in the infrared region of the light spectrum and substantially nonresponsive to light in the visible region of the light spectrum;
   amplifier means having associated therewith a gain for amplifying said light signal;
   comparison means for producing an output signal when said amplified light signal crosses a threshold level;
   control means responsive to said output signal for controlling the energization of said high beam headlamps; and
   hysteresis means for controlling the gain of said amplifier means in accordance with the state of said high beam headlamps.

13. The system according to claim 12 wherein said hysteresis means is adapted to set the gain of said amplifier means at a first value when the high beam headlamps are energized and at a second level lower than said first level when the high beam lamps are off.

14. The system according to claim 13 wherein said photodetector comprises a silicon photodetector that is responsive to light in the visible and infrared regions of the light spectrum.

15. The system according to claim 14 wherein the headlamps of the vehicle comprise conventional unfiltered incandescent lamps that emit light in the visible and infrared regions of the light spectrum.

* * * * *